United States Patent
Takeshima et al.

(10) Patent No.: US 8,423,593 B2
(45) Date of Patent: Apr. 16, 2013

(54) CONTENT DISTRIBUTION SYSTEM

(75) Inventors: Ryota Takeshima, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/059,103

(22) PCT Filed: Aug. 25, 2009

(86) PCT No.: PCT/JP2009/064748
§ 371 (c)(1),
(2), (4) Date: Feb. 15, 2011

(87) PCT Pub. No.: WO2010/024228
PCT Pub. Date: Mar. 4, 2010

(65) Prior Publication Data
US 2011/0153698 A1 Jun. 23, 2011

(30) Foreign Application Priority Data
Aug. 25, 2008 (JP) .................... 2008-214817

(51) Int. Cl.
*G06F 17/30* (2006.01)
(52) U.S. Cl.
USPC ........... 707/822; 707/802; 707/828; 707/791; 707/722; 707/688
(58) Field of Classification Search ........... 707/600–899
See application file for complete search history.

(56) References Cited

U.S. PATENT DOCUMENTS
2007/0053655 A1* 3/2007 Fujiwara ................... 386/68
2011/0035270 A1 2/2011 Matsunaga et al.

FOREIGN PATENT DOCUMENTS

| JP | 2001312461 A | 11/2001 |
| JP | 2002123760 A | 4/2002 |
| JP | 2003067194 A | 3/2003 |
| JP | 2003242074 A | 8/2003 |
| JP | 2004063058 A | 2/2004 |
| JP | 2004199217 A | 7/2004 |
| JP | 2004213340 A | 7/2004 |
| JP | 2005031987 A | 2/2005 |
| JP | 2005269494 A | 9/2005 |
| JP | 2008059347 A | 3/2008 |
| WO | 2008081595 A1 | 7/2008 |

OTHER PUBLICATIONS

Chinese Office Action for CN200980132346.4 mailed on Sep. 5, 2012.
International Search Report for PCT/JP2009/064748 mailed Nov. 24, 2009.
Japanese Office Action for JP2010-526705 mailed on Nov. 20, 2012.

* cited by examiner

*Primary Examiner* — Isaac M Woo

(57) ABSTRACT

A contents distribution system distributes contents to the reproduction terminals (103). A contents distribution system comprises a first contents distribution server (101) and one or more contents storage servers (102). This system makes it possible that the CM contents recorded in each of CM distribution servers (101) is distributed to multiple CM storage servers (102) and the multiple CM storage servers (102) distribute the CM contents to the reproduction terminals (103). Using multiple CM storage servers (102), the processing load of CM distribution can be shared. Compared with the case in which the CM distribution server (101) directly distributes CM to the reproduction terminals (103), the processing load of each of CM distribution servers (101) can be reduced.

2 Claims, 16 Drawing Sheets

Fig.3

201 INFORMATION STORED IN CM DISTRIBUTION SERVER

| CM IDENTIFIER | NUMBER OF VIEWINGS | TOTAL NUMBER OF CM DISTRIBUTIONS | CM GROUP INFORMATION |
|---|---|---|---|
| 001 | 50 | 100 | A |
| 002 | 70 | 200 | A |
| 003 | 30 | 200 | B |
| 004 | 40 | 300 | C |

Fig. 5

301 INFORMATION STORED IN CM STORAGE SERVER

| CM IDENTIFIER | NUMBER OF VIEWINGS | PLANNED NUMBER OF DISTRIBUTIONS | CM GROUP INFORMATION |
|---|---|---|---|
| 001 | 5 | 10 | A |
| 002 | 10 | 20 | A |
| 003 | 6 | 20 | B |
| 004 | 9 | 30 | C |

Fig.13

BEFORE TRANSFER

CM STORAGE SERVER 102a-1

| CM IDENTIFIER | NUMBER OF VIEWINGS | PLANNED NUMBER OF DISTRIBUTIONS | CM GROUP INFORMATION |
|---|---|---|---|
| 001 | 20 | 50 | A |

CM STORAGE SERVER 102a-2

| CM IDENTIFIER | NUMBER OF VIEWINGS | PLANNED NUMBER OF DISTRIBUTIONS | CM GROUP INFORMATION |
|---|---|---|---|
| 001 | 40 | 50 | A |

CM STORAGE SERVER 102a-3

| CM IDENTIFIER | NUMBER OF VIEWINGS | PLANNED NUMBER OF DISTRIBUTIONS | CM GROUP INFORMATION |
|---|---|---|---|
| 001 | 37 | 50 | A |

Fig.14

AFTER TRANSFER

CM STORAGE SERVER 102a-1

| CM IDENTIFIER | NUMBER OF VIEWINGS | PLANNED NUMBER OF DISTRIBUTIONS | CM GROUP INFORMATION |
|---|---|---|---|
| 001 | 20 | 35 | A |

CM STORAGE SERVER 102a-2

| CM IDENTIFIER | NUMBER OF VIEWINGS | PLANNED NUMBER OF DISTRIBUTIONS | CM GROUP INFORMATION |
|---|---|---|---|
| 001 | 40 | 65 | A |

CM STORAGE SERVER 102a-3

| CM IDENTIFIER | NUMBER OF VIEWINGS | PLANNED NUMBER OF DISTRIBUTIONS | CM GROUP INFORMATION |
|---|---|---|---|
| 001 | 40 | 50 | A |

CONTENT DISTRIBUTION SYSTEM

The present application is the National Phase of PCT/JP2009/064748, filed Aug. 25, 2009, which is based on and claims the priority of Japanese Patent Application No. 2008-214817 filed on Aug. 25, 2008, the entire disclosure of which is incorporated herein by reference.

TECHNICAL FIELD

The present invention relates to a contents distribution system and particularly to a contents distribution system distributing contents to terminals where those contents are reproduced. The present invention further relates to contents storage server, contents distribution method, and program used in the above contents distribution system.

BACKGROUND ART

Recently, contents distribution services on the Internet and cellular phone networks have rapidly become in common use. Attaching advertisements appropriate for contents, free contents distribution services have increasingly become available. The advertisements are attached to the contents, for example, by inserting commercial message (CM) into contents as in television programs or by displaying CM in advertisement part that is reserved on the terminal screen different from the contents reproduction part.

Patent Literature 1 discloses an information management system for distributing CM contents. The information management system disclosed in the Patent Literature 1 has a contents distribution server and a CM distribution server. In the Patent Literature 1, the contents distribution server and CM distribution server are independent each other so that discretionary CM contents distribution can be done depending on the user attribute of the contents reproduction terminal.

Patent Literature 2 discloses a broadcast program viewing system for efficiently distributing CM. The broadcast program viewing system described in the Patent Literature 2 comprises a management device, a broadcast program storage device, and a CM storage device. The broadcast program storage device and CM storage device are provided for each local region of the nation. It is preferably that the stored contents in the broadcast program storage devices and CM storage devices always in sync with the latest states; however, they can be different from each other. The management device receives area information from user terminals and selects CM to be inserted in broadcast program contents based on the area information. The broadcast program storage device and CM storage device distribute contents to the user terminals in a streaming-distribution manner based on instructions from the management device.

Prior Art Literature

Patent Literature

Patent Literature 1: Unexamined Japanese Patent Application KOKAI Publication No. 2004-213340 (Abstract, FIG. 3); and Patent Literature 2: Unexamined Japanese Patent Application KOKAI Publication No. 2005-269494 (0017, 0023-0027, FIG. 2).

Disclosure Of Invention

Problem Solved by the Invention

However, contents distribution systems have the following problem. For CM is referred by multiple contents, the CM distribution server becomes overloaded. When path between a reproduction terminal and the CM distribution server is busy, the process is delayed. The information management system described in the Patent Literature 1, whose contents distribution server and CM distribution server are independent each other so as to reduce the CM distribution process that used to be executed by the contents distribution server, does not solve the above problem.

In the Patent Literature 2, a CM storage device is provided for each local region. The same CM contents are distributed from multiple CM storage devices and, therefore, the processing load of a CM distribution server is presumably reduced. However, the number of CM distributions is not managed in the Patent Literature 2. Therefore, the broadcast program viewing system described in Patent Literature 2 has no way to control to end CM distributions after CM contents have been reproduced a given number of times at user terminals. In other words, the CM storage device can't distribute CM a planned number of distributions while reducing the processing load of the CM distribution server.

The purpose of the present invention is to provide a contents distribution system, method, and recording medium that allow for distributing contents with a planned number of distributions while reducing the processing load of the contents distribution server.

Means for Solving the Problems

The present invention provides a contents distribution system comprising a first contents distribution server and one or more contents storage servers, wherein the first contents distribution server comprises a contents record means that records contents management information including information about a total distribution quantity of a first contents of to be reproduced at reproduction terminals connected to the system, in a management information memory, wherein a contents distribution means that distributes the first contents to the at least one or more contents storage servers distributing the first contents to the reproduction terminals, determines a planned distribution quantity for each of the one or more contents storage servers that are to distribute the first contents, wherein the planned distribution quantity is based on the total distribution quantity, and sends the planned distribution quantity to each of the one or more contents storage servers, respectively, and wherein each of the one or more contents storage servers comprises a contents storage means that receives the first contents and a information about the planned distribution quantity from the first contents distribution server, records the first contents in a contents storage, and records in a control information memory contents control information, wherein the contents control information is information about the planned distribution quantity and information about a reproduction quantity, wherein the reproduction quantity represents an amount of the first contents at that has been reproduced at the reproduction terminals, and a contents transmission means that transmits the first contents to the reproduction terminals until the reproduction quantity of the first contents at the reproduction terminals reaches the reproduction quantity represented by the information about the planned distribution quantity.

The present invention provides a contents distribution server, comprising a contents record means that records contents management information including information about a total distribution quantity of contents which is to be distributed and to be distributed to be reproduced at reproduction terminals, in a management information memory; and a contents distribution means that distributes the contents to the at least one or more contents storage server distributing the contents to the reproduction terminals, and sends a planned distribution quantity determines a planned distribution quantity for each of the one or more contents storage servers that are to distribute the first contents, wherein the planned distribution quantity is based on the total distribution quantity, and sends the planned distribution quantity to each of the one or more contents storage servers, respectively.

The present invention provides a contents storage server, comprising a contents storage means that receives contents and information about the planned distribution quantity obtained that is determined based on the total distribution quantity of the contents to be reproduced at reproduction terminals from a contents distribution server distributing the contents, stores the contents in a contents storage, and records the information about planned distribution quantity in a control information memory; a reproduction quantity recording means that records in a control information memory contents control information, wherein the contents control information is information about the reproduction quantity of the contents reproduction at the reproduction terminals that have received the contents and the information about planned distribution quantity; and a contents transmission means that transmits the contents to the reproduction terminals until the reproduced quantity at the reproduction terminals reaches the reproduction quantity indicated by the information about planned distribution.

The present invention provides a contents delivery method for delivering contents using a computer, having a step in which the computer stores contents to be distributed in a contents storage, and records information about total distribution quantity indicating the quantity of the contents to be reproduced at reproduction terminals in an management information memory that records contents management information including the information about total distribution quantity information; and a step in which the computer distributes the contents to one or more contents storage servers distributing the contents to reproduction terminals, determines a planned distribution quantity for each of the one or more contents storage servers that are to distribute the first contents, wherein the planned distribution quantity is based on the information about total distribution quantity, and sends the planned distribution quantity to each of the one or more contents storage servers, respectively.

The present invention provides a contents delivery method for delivering contents using a computer, having a step in which the computer receives contents and information about planned distribution quantity that is determined based on the information about total distribution quantity indicating the quantity of the contents to be reproduced at reproduction terminals, from contents distribution server distributing contents; a step in which the computer stores the contents in a contents storage and records the information about planned distribution quantity in a control information memory recording contents control information including the information about planned distribution quantity and the information about reproduction quantity indicating the reproduction quantity of contents at reproduction terminals; a step in which the computer records the information about reproduction quantity of the first contents distributed from the computer to reproduction terminals and reproduced at the reproduction terminals, in the control information memory; and a step in which the computer transmits the contents to the reproduction terminals until the reproduced quantity reaches at least the reproduction quantity indicated by the information about planned distribution.

The present invention provides a computer-readable program stored in a computer readable recording medium and allowing the computer to execute: a procedure to store contents to be distributed in a contents storage, and record information about total distribution quantity indicating the quantity of the contents to be reproduced at reproduction terminals in an management information memory that records contents management information including the information about total distribution quantity information; and a procedure to distribute the contents to one or more contents storage servers distributing contents to the reproduction terminals, determines a planned distribution quantity for each of the one or more contents storage servers that are to distribute the first contents, wherein the planned distribution quantity is based on the information about total distribution quantity and sends the planned distribution quantity to each of the one or more contents storage servers, respectively.

The present invention provides a computer-readable program stored in a computer readable recording medium and allowing the computer to execute a procedure to receive contents and information about planned distribution quantity that is determined based on the information about total distribution quantity indicating the quantity of the contents to be reproduced at reproduction terminals, from contents delivery sever delivering contents; a procedure to store the contents in a contents storage and record the information about planned distribution quantity in a control information memory recording contents control information including the information about planned distribution quantity and the information about reproduction quantity indicating the reproduction quantity of contents at reproduction terminals; a procedure to record the information about reproduction quantity of the first contents distributed to reproduction terminals and reproduced at the reproduction terminals, in the control information memory; and a procedure to transmit the contents to the reproduction terminals until the reproduction quantity reaches at least the reproduction quantity indicated by the information about planned distribution quantity.

Effect of the Invention

The contents distribution system, method, and program of the present invention can distribute contents a planned number of times while reducing the processing load of the contents distribution server.

The above and other purposes, characteristics, and benefit of the present invention will be apparent from the following explanation with reference to the drawings.

BRIEF DESCRIPTION OF DRAWINGS

[FIG. 3] A figure showing exemplary information recorded on the CM distribution server;

[FIG. 5] A figure showing exemplary information recorded in the CM storage server;

[FIG. 13] A figure illustrating CM control information in each CM storage server before transfer;

[FIG. 14] A Figure illustrating CM control information in each CM storage server after transfer;

BEST MODES FOR CARRYING OUT THE INVENTION

Figure 1:
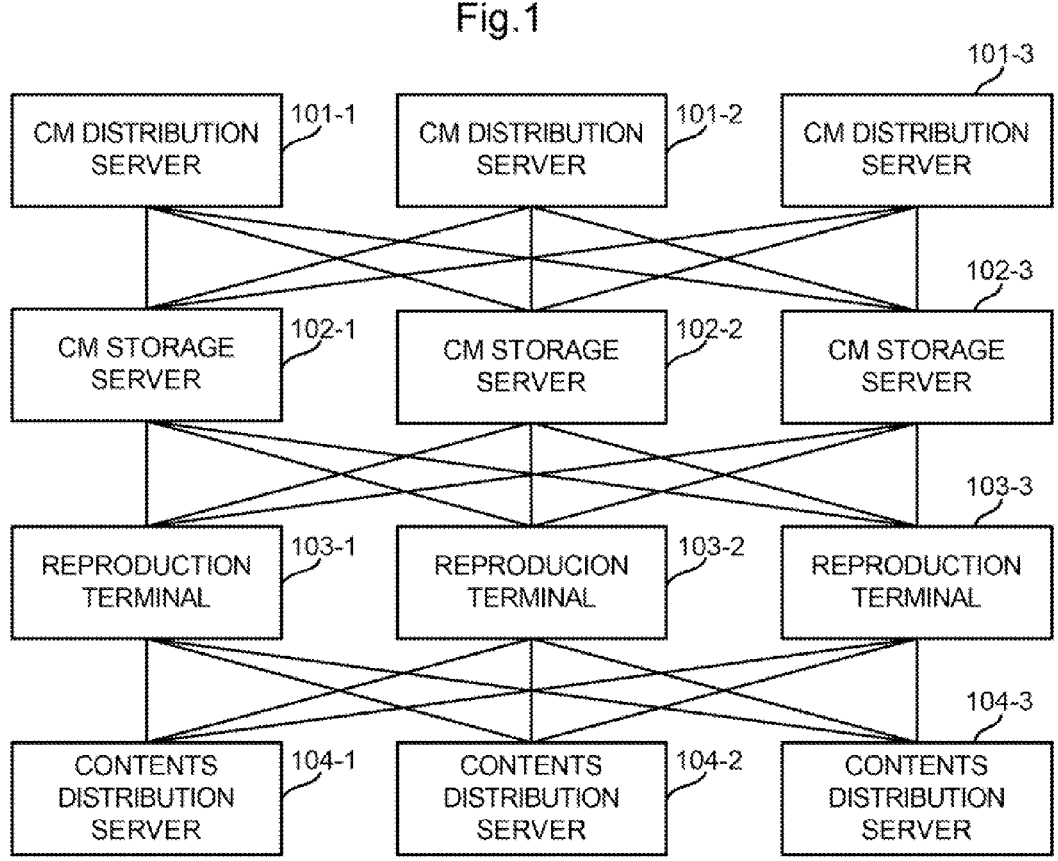
[FIG. 1] A block diagram illustrating the contents distribution system of Embodiment 1 of the present invention.

Embodiments of the present invention will he described in detail hereafter with reference to the drawings. FIG. 1 illustrates the contents distribution system of Embodiment 1 of the present invention. The contents distribution system (CM distribution system) has CM distribution servers 101, CM storage servers 102, and contents distribution servers 104. The CM distribution servers 101, CM storage servers 102, and contents distribution servers 104 can be composed of a computer system controlled by a program.

In FIG. 1, three CM distribution servers 101-1 to 101-3, three CM storage servers 102-1 to 102-3, and three reproduction terminals 103-1 to 103-3, and three contents distribution servers 104-1 to 104-3 are shown. However, the numbers of servers and terminals are not restricted to three. Any number of devices can exist as long as at least one of each kind of device is provided.

The contents distribution system distributes contents to the reproduction terminals 103. There are two types of contents to be distributed. One is CM contents (first contents) and the other is broadcast program contents (second contents). The CM distribution servers 101 correspond to first contents distribution servers distributing first contents. The contents distribution servers 104 correspond to second contents distribution servers distributing second contents. The CM storage servers 102 correspond to contents storage servers storing the contents distributed by the CM distribution server 101.

Each CM distribution server 101 is connected to at least one CM storage server 102. The CM distribution servers 101 store CM contents to be reproduced at the reproduction terminals 103. Furthermore, the CM distribution servers 101 store contents management information including the information about total distribution quantity presenting the reproduction quantity of CM contents at the reproduction terminals 103, in a management information memory. The information about total distribution quantity corresponds to the distribution quantity (the total number of CM distributions) of the CM contents on an agreement between the CM distributor (distribution company) and the CM-providing sponsor.

The CM distribution servers 101 distribute the held CM contents to the CM storage server 102. CM contents that one CM distribution server 101 distributes can be one or more CM contents. Furthermore, each CM distribution server 101 may distribute different CM contents to different CM storage servers 102 or distribute the same CM contents to multiple CM storage servers 102. The CM distribution servers 101 send, to the distribution destination CM storage servers 102, the information about planned distribution quantity obtained by allocating the information about total distribution quantity among the distribution destinations which are the CM storage servers 102.

Each CM storage server 102 is connected to at least one of the CM distribution servers 101 and at least one of the reproduction terminals 103. Each of CM storage servers 102 receives CM contents and information about planned distribution quantity from the CM distribution server(s) 101. Each of CM storage servers 102 stores the contents distributed from the CM distribution server 101 in a contents storage. Each of CM storage servers 102 may receive and store different CM contents from different CM distribution servers 101 and/or receive and store the same CM contents from multiple CM distribution servers 101. Each of CM storage servers 102 records the received information about planned distribution quantity in a control information storage storing contents control information including the information about planned distribution quantity and information about reproduction quantity indicating the quantity of CM contents reproduced at the reproduction terminal 103.

Each of CM storage servers 102 distributes the stored CM contents to the reproduction terminals 103. The CM storage server 102 counts and/or measures the reproduction quantity, that is, how much and/or how many of the CM contents have been distributed from the CM storage server 102 to the reproduction terminals 103 and reproduced at the reproduction terminals 103. The CM storage server 102 records the information about measured reproduction quantity in the control information storage. Each of CM storage servers 102 refers to the control information storage in distributing CM contents, and compares the planned distribution quantity with the reproduction quantity. Each of CM storage servers 102 distributes the CM contents to the reproduction terminals 103 until the reproduction quantity at the reproduction terminal 103 reaches at least the reproduction quantity indicated by the information about planned distribution quantity.

Each of contents distribution servers 104 is connected to at least one of the reproduction terminals 103. Each of contents distribution servers 104 stores contents and distributes the contents to the reproduction terminals 103. Each of reproduction terminals 103 is connected to at least one of the CM storage servers 102 and at least one of the contents distribution servers 104. Each of reproduction terminals 103 is, for example, a computer controlled by a program. Each of reproduction terminals 103 reproduces the contents distributed from the contents distribution server(s) 104. Furthermore, each of reproduction terminals 103 reproduces the CM contents distributed from the CM storage server(s) 102.

Figure 2:
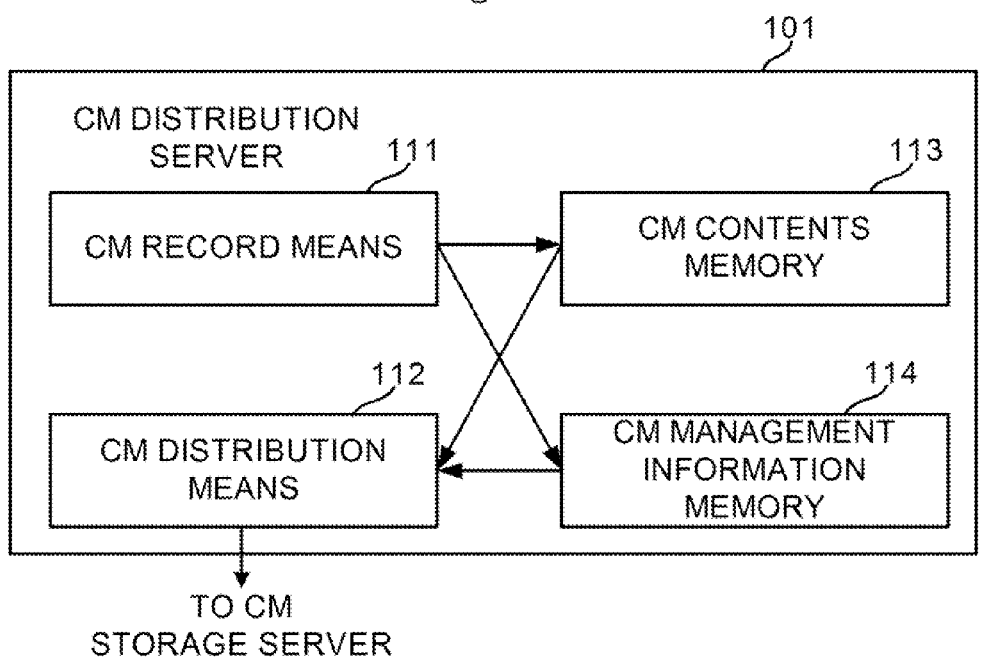
[FIG. 2] A block diagram illustrating the configuration of a CM distribution server.

FIG. 2 illustrates the configuration of CM distribution server 101. The CM distribution server 101 has a CM record means (contents record means) 111, a CM distribution means (contents distribution means) 112, a CM contents memory (contents memory) 113, and a CM management information memory (management information memory) 114. After preparation of CM contents distribution (creation and edition of CM contents and signing of distribution quantity agreement) is done, the CM records administrator instructs the CM record means 111 to record the CM contents. The CM record means 111 record the CM contents to be distributed on the CM contents memory 113 according to the instruction. Furthermore, the CM record means 111 records CM management information (contents management information) including the information about total distribution quantity of the CM contents in the CM management information storage 114 in recording of the CM contents.

FIG. 3 illustrates exemplary data of the CM management information. CM management information (the information hold in CM distribution server) 201 includes a CM identifier, the number of viewings, total number of CM distributions, and CM group information. The CM identifier is an identifier uniquely identifying CM contents in the CM distribution system. The CM group information is information indicating the group to which the CM contents belongs (contents group information) if the CM contents are grouped. The grouping is based on, for example, the duration (length) of the CM, CM provider, CM medium (image, video, sound, and their format), and preference of the CM.

The total number of CM distributions is the number of planned total times (quantity) of CM contents to be reproduced at the reproduction terminals 103 and corresponds to the total number of reproduction of the CM according to the agreement between the CM distributor and CM-providing sponsor. The number of viewings indicates the reproduced times (quantity) of the CM contents (performance record) at the reproduction terminals 103. The number of viewings is the actual total number of reproductions at the reproduction terminal 103. Immediately after the CM contents are recorded in a CM distribution server 101, the number of viewings is zero. The total number of CM distributions and CM group information are entered by the administrator.

The CM identifier and CM group information can be issued/detected by a device corresponding to a database server provided in the system for detecting and managing the identifier and group of CM contents. The CM group information can be detected by the device corresponding to database server based on the degree of similarity calculated from information such as the CM duration, CM provider, CM medium, and preference of CM. The data shown in FIG. 3 is just an example of CM management information and the CM management information is not limited to the data shown in FIG. 3. For example, the total number of CM distributions and the number of viewings can be replaced by the total distribution time and the total viewing time as long as those are information that can quantitatively define the CM reproduction.

Returning to FIG. 2, the CM distribution means 112 distributes the CM contents recorded in the CM contents memory 113 to at least one of the CM storage servers 102. The CM distribution means 112 distributes CM contents according to instructions from the operator. Otherwise, the CM distribution means 112 can automatically distribute CM contents after the CM contents are recorded in the CM contents memory 113. In one embodiment, the CM contents are distributed to the CM storage server(s) 102 before the reproduction terminal(s) 103 start(s) reproducing the CM contents.

The CM distribution means 112 selects a CM storage server 102 to which CM contents are to he distributed among the connected CM storage servers 102 in distribution of CM contents. The CM distribution means 112 selects a CM storage server 102 to which CM contents are to be distributed based on, for example, information about the CM storage servers 102 connected to the CM storage server 102 associated with the CM distribution means 112. Otherwise, the CM distribution system has a device corresponding to a database server that collects and manages information about the CM storage servers 102 and the CM distribution means 112 acquires information about CM storage servers 102 that are close to the CM distribution server 101 with the network distance from the database server to select a CM storage server 102 to which CM contents are to be distributed.

The CM distribution means 112 may distribute one CM content at a time or multiple CM contents at a time to CM storage server 102. The CM distribution means 112 may distribute the same CM contents to multiple CM storage servers 102 or different CM contents to each distribution destination CM storage servers 102 in the time of distribution of multiple CM contents.

The CM distribution means 112 transmits to the CM storage server 102 CM contents and information such as the CM identifier, the CM group information, and the number of planned distributions from the CM storage server 102 to which CM contents are to be distributed of the CM contents. The number of planned distributions from the CM storage server 102 corresponds to the information about planned distribution quantity (times) obtained by allocating the number of total distributions among the distribution destinations and is a value obtained by allocating the total number of CM distributions in the CM management information 201 (FIG. 3) among the CM storage servers 102 to which CM contents are to be distributed. For example, the CM distribution means 112 sets the planned number of distributions of each the CM storage servers 102-1 and 102-2 at 50/2=25 when the total number of CM distributions is "50" and there are CM storage servers 102-1 and 102-2 to which CM contents are to be distributed.

In allocating the total number of CM distributions to the number of planned distributions among the CM storage servers 102, the CM distribution means 112 equally allocates, in one embodiment, the total number of CM distributions among the distribution destination CM storage servers 102. In another embodiment, the CM distribution means 112 allocates the distribution at any arbitrary ratio other than an equal distributions. In distributing multiple CM contents from the CM distribution server 101 to CM storage servers 102, the CM distribution means 112 may distribute all CM contents at an equal ratio or at a different ratio for each CM contents. For example, contents are distributed to the CM storage server 102-1 at a higher rate and to the CM storage server 102-2 at a lower rate while other contents are distributed to the CM storage server 102-1 at a lower rate and to the CM storage server 102-2 at a higher rate. At this time, when there is only one CM storage server 102, the total number of CM distributions is equal to the number of planned distributions to the CM storage server 102.

The number of total distributions in the CM management information 201 can be increased due to additional agreement after the contents are recorded. In such a case, the CM distribution means 112 divides the number of additionally increased distributions by the number of CM storage servers to which the CM contents are to be distributed to acquire the planned distribution quantity to the CM storage server 102. For example, when the total number of CM distributions is increased from "50" to "100" after the CM contents was distributed, the value (50) that is obtained by subtracting the number already distributed to the CM storage server 102 from the increased total number of CM distributions (100), is divided by the number of CM storage servers 102 to which CM contents are to be distributed at this time.

After distributing CM contents to the CM storage server 102, the CM distribution means 112 acquires the number of reproductions of the CM contents at the reproduction terminal 103 from the CM storage server 102 storing the distributed CM contents. The CM distribution means 112 records the acquired number of reproductions in the CM management information storage 114. For example, with regard to CM contents, the CM distribution means 112 acquires the numbers of reproductions "10" and "15" from the CM storage servers 102-1 and 102-2, respectively, and records "25" in the number of viewings of the CM management information (FIG. 3).

Figure 4:
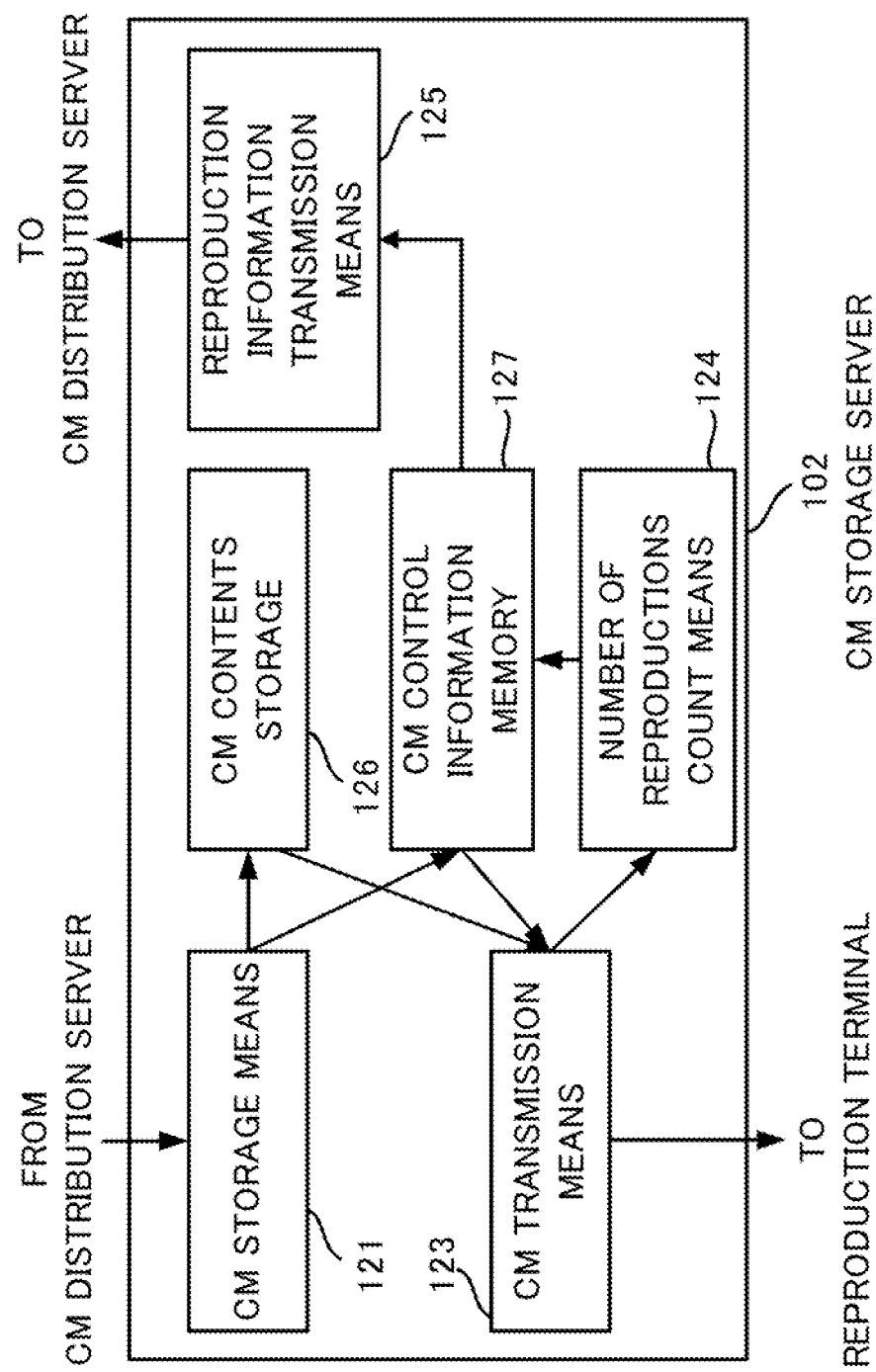
[FIG. 4] A block diagram illustrating the configuration of a CM storage server.

FIG. 4 illustrates the configuration of CM storage servers 102. Each of CM storage servers 102 has a CM storage means (contents storage means) 121, a CM transmission means (contents transmission means) 123, a number of reproductions count means (reproduction quantity recording means) 124, a reproduction information transmission means 125, a CM contents storage (contents storage) 126, and a CM control information memory (control information memory) 127.

The CM storage means 121 receives CM contents, a CM identifier, CM group information, and the planned number of CM distributions, from the CM distribution server 101. The CM storage means 121 stores the received CM contents in the CM contents storage 126. In doing so, the CM storage means 121 stores information to identify the CM distribution server 101 from which the CM contents are to be acquired, in association with the stored CM contents. Furthermore, the CM storage means 121 stores, in the CM control information memory 127, the CM identifier, the CM group information, and the planned number of CM distributions received from the CM distribution server 101 along with the CM contents.

FIG. 5 illustrates exemplary data of information held by the CM storage server. The information held by the CM storage server (CM control information) 301 has the CM identifier, the CM group information, the planned number of CM distributions, and the number of viewings. The CM control information 301 is similar to the CM management information 201 (FIG. 3) kept in the CM distribution servers 101. However, the planned number of CM distributions is the planned number of distributions to each CM storage servers 102, not the total number of distributions of CM contents in the whole system. Furthermore, the number of viewings is the sum of the CM storage server 102 has reproduced the CM contents at the reproduction terminal 103.

At this time, the data shown in FIG. 5 is exemplary CM control information 301 and the CM control information 301 is not limited to the data shown in FIG. 5. Same as the CM management information 201 kept in the CM distribution servers 101, the planned number of CM distributions and the number of viewings can be replaced by the total distribution time and viewing time. If multiple CM contents having the same CM identifier are acquired from multiple CM distribution servers 101, the CM storage means 121 records the information about the CM contents having the same CM identifier in the CM control information memory 127 at different entries. At this time, the CM storage means 121 creates a field that stores the CM distribution server 101 from which the CM contents are to be acquired in the CM control information 301 and registers the CM distribution server 101 from which the CM contents are to be acquired in the CM control information.

Returning to FIG. 4, the CM transmission means 123 transmits the CM contents stored in the CM contents storage 126, to the reproduction terminal 103. The CM transmission means 123 refers to the CM control information memory 127 and transmits the CM contents to the reproduction terminals 103 until the number of reproductions reaches at least the planned number of CM distributions. The CM contents are transmitted possibly in the following two ways: In the first way, the CM transmission means 123 receives a CM acquisition request from the reproduction terminal(s) 103 each time the CM contents are reproduced and, in response to the CM acquisition request, transmits the CM contents. In the second way, the CM transmission means 123 periodically transmits the CM contents and the reproduction terminal(s) 103 reproduces the CM contents at any time and any number of times.

The CM transmission means 123 receives CM group information from the reproduction terminal(s) 103 and transmits the CM contents corresponding to the received CM group information to the reproduction terminal(s) 103. More specifically, the CM transmission means 123 refers to the CM control information 301 (FIG. 5) and searches for the CM contents having the group information matching the CM group information received from the reproduction terminal(s) 103. The CM transmission means 123 selects the searched CM contents as the CM contents to be transmitted to the reproduction terminal 103. If there are multiple CM contents having the CM group information of interest, the CM transmission means 123 determines the CM contents to transmit. In one embodiment, to determine the CM contents to transmit, the CM transmission means 123 calculates values by subtracting the number of viewings from the planned number of CM distributions in the CM control information 301 for each of the CM contents (the remaining number of distributions), compares remaining numbers of distributions, and selects the CM contents that have the greatest remaining number of distributions as the CM contents to be transmitted.

In one embodiment, to determine the CM contents to transmit, the CM contents to be transmitted is selected by any of a number of methods for selecting one from the multiple CM contents, such as by server proximity or randomly. Furthermore, the CM contents may be selected randomly from multiple contents. Otherwise, it is possible to add preference information to the CM control information, acquire the preference information from the reproduction terminal 103, and select the CM contents having the matched preference information. In situations where the CM group information is not received from the reproduction terminals 103 or no group is specified in the CM group information, the CM transmission means 123 may select any CM contents from multiple CM contents in the CM contents storage 126 as the CM contents to be transmitted.

The number of reproductions count means 124 counts the reproduction times (the number of viewings) of the CM contents transmitted by the CM transmission means 123 at the reproduction terminal 103. The number of reproductions count means 124 receives information indicating to which reproduction terminal 103 and which CM contents the CM transmission means 123 has transmitted, from the CM transmission means 123. The number of reproductions count means 124 counts the number of reproductions of each CM contents. And when CM contents having the CM identifier is reproduced at any of the reproduction terminals 103 to which the CM contents are to be distributed, the number of reproductions count means 124 increments the number of reproductions of the CM contents having the CM identifier. Otherwise, the number of reproductions count means 124 may record the number of reproductions per each content and per each reproduction terminal 103 and the total number of reproductions of each CM contents.

The number of reproductions count means 124 records the counted number of reproductions in the CM control information 301. The reproduction information transmission means 125 transmits the number of viewings in the CM control information 301 to the CM distribution server 101 from which the contents are to be acquired along with the CM identifier when the CM control information 301 is updated.

The CM control information 301 may periodically be transmitted at any intervals. After distributing CM contents, the CM distribution means 112 of the CM distribution server 101 (FIG. 2) collects the CM identifier and the number of viewings from the CM storage server 102 to which the CM contents have been distributed and updates the CM management information 201 kept in the CM distribution server 101.

For example, a case in which the CM distribution server 101-1 distributes the same CM contents (the CM identifier 001) to the CM storage servers 102-1 and 102-2 is discussed further herein. The number of reproductions count means 124 of the CM storage server 102-1 counts the number of times the reproduction terminal 103 has received the CM contents from the CM storage server 102-1 and reproduced the CM contents having the CM identifier 001, and records the number in the CM control information 301. Meanwhile, the number of reproductions count means 124 of the CM storage server 102-2 counts the number of times the reproduction terminal 103 has received the CM contents from the CM storage server 102-2 and reproduced the CM contents having the CM identifier 001, and records the number in the CM control information 301.

The reproduction information transmission means 125 of the CM storage server 102-1 transmits the number of viewings of the CM identifier 001 that is counted by the CM storage server 102-1 to CM distribution server 101-1 from which the CM contents are to be acquired. The reproduction information transmission means 125 of the CM storage server 102-2 transmits the number of viewings of the CM identifier 001 that is counted by the CM storage server 102-2, to the CM distribution server 101-1 from which CM contents are to be acquired. The CM distribution means 112 of the CM distribution server 101 collects the number of viewings of the CM contents having the CM identifier 001 from the CM storage servers 102-1 and 102-2. The CM distribution means 112 totals the collected number of viewings and records the total number of viewings at the entry of the CM identifier 001 in the CM management information 201 (FIG. 3).

At this time, if each of the reproduction terminals 103 is designated to transmit a CM acquisition request to the CM storage server(s) 102 each time it reproduces CM contents, the transmission of CM contents produces the reproduction of the CM contents at the reproduction terminal 103. Therefore, the number of reproductions count means 124 increments the number of viewings of the CM contents in the CM control information 301 after the transmission of the CM contents. On the other hand, if the CM storage server 102 periodically transmits CM contents, how many times the CM contents will be reproduced is unknown. The CM contents may not be reproduced before another CM contents are to be distributed in the next cycle. In other words, the transmission of CM contents does not means the reproduction of the CM contents. In such a case, the number of reproductions count means 124 receives the number of reproductions of each CM contents from the reproduction terminals 103 and updates the CM control information 301.

Instead of the composition that each of CM storage servers 102 that has received CM contents transmits the number of viewings in the CM control information 301 to the CM distribution server 101, a composition that one CM storage server 102 is selected as a representative server and allows the representative server from CM contents servers 102 to which the CM contents are to be distributed, and the representative server totals the number of viewings and transmits the total to the CM distribution server 101. In such a case, the CM storage servers 102 other than the representative server transmit the CM identifier and the number of viewings to the representative CM storage server 102 each time they update the CM control information 301.

Figure 6:
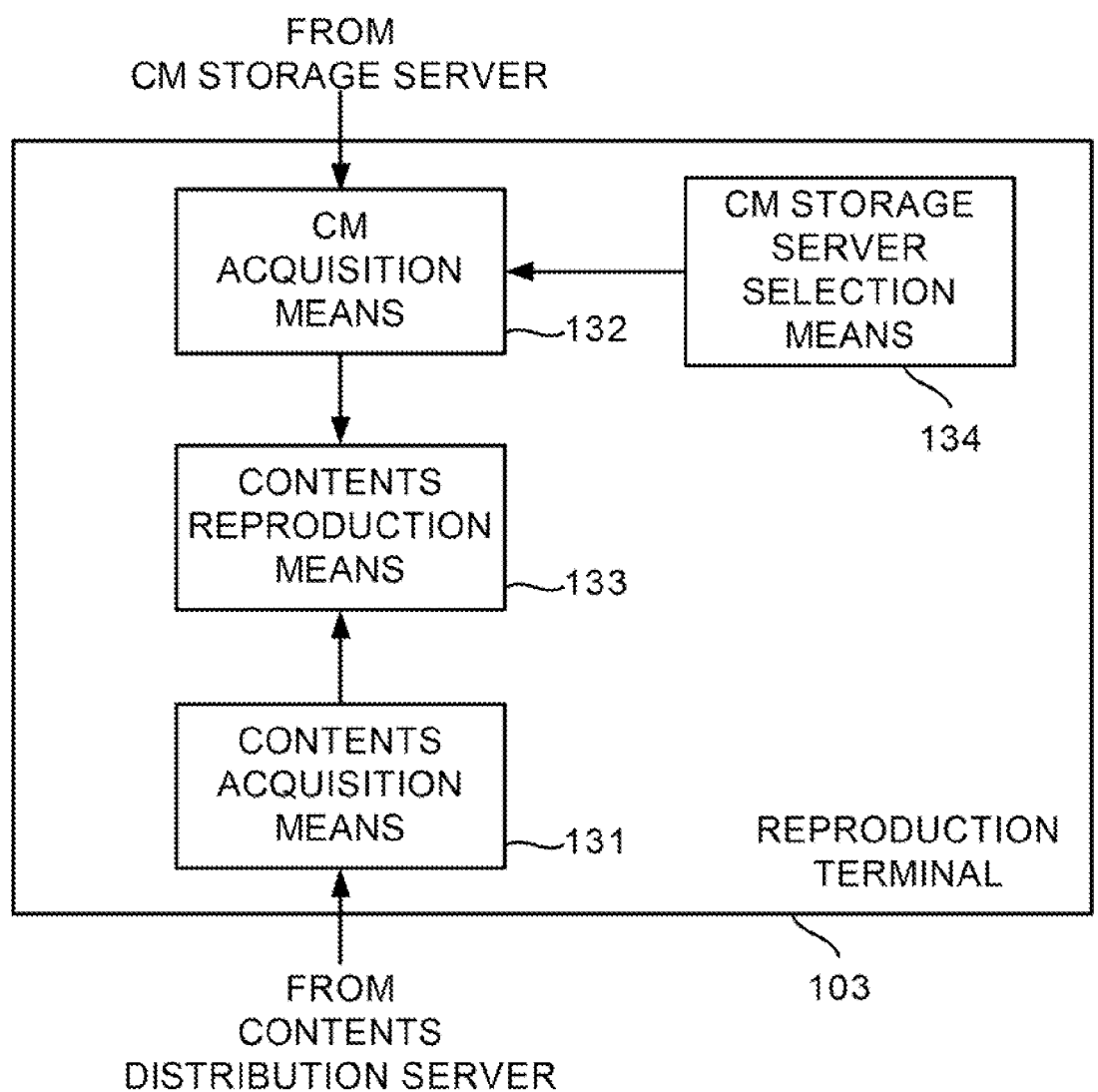
[FIG. 6] A figure showing the configuration of a reproduction terminal.

FIG. 6 illustrates the configuration of a reproduction terminal 103. Each of reproduction terminals 103 has a contents acquisition means 131, a CM acquisition means 132, a contents reproduction means 133, and a CM storage server selection means 134. The CM acquisition means 132 acquires CM contents (first contents) transmitted by the CM storage server 102 that is a contents storage means. The contents acquisition means 131 acquires contents (second contents) distributed by the contents distribution server 104 that is a second contents distribution means.

The contents reproduction means 133 reproduces the contents acquired by the contents acquisition means 131 and reproduces the CM contents acquired by the CM acquisition means 132. The timing to reproduce CM contents may be determined by the contents distribution server(s) 104 or determined by a contents reproduction application on an arbitrary basis. The CM acquisition means 132 transmits a CM acquisition request to the CM storage server(s) 102 in sync with the timing of reproducing CM contents and acquires CM contents. Otherwise, the CM acquisition means 132 can acquire CM contents at any time not in sync with the timing of reproducing CM contents.

Each of contents distribution servers 104 can transmit to the reproduction terminal(s) 103 the CM group information of CM contents to be reproduced in reproducing the contents, to specify the group of the CM contents to be reproduced. If the contents acquisition means 131 acquires the CM group information along with the contents from the contents distribution server(s) 104, the contents acquisition means 131 provides the acquired CM group information to the CM acquisition means 132. In one embodiment, the CM acquisition means 132 transmits the CM acquisition request including CM group information to the CM storage server(s) 102, and acquires CM contents corresponding to the CM group information from the CM storage server(s) 102. In another embodiment, the CM acquisition means 132 acquires from the CM storage server 102 CM contents corresponding to CM group information selected by the reproduction terminal 103 on and reproduce the CM contents instead of receiving any CM group information from the contents distribution server 104.

At the time the CM acquisition means 132 acquires CM contents, the CM storage server selection means 134 selects a CM contents storage server 102 from which the contents are to be acquired, from CM storage servers 102 which are candidates to which CM contents are to be distributed. The CM storage server selection means 134 selects a CM storage server 102 having CM contents corresponding to the CM group information to be reproduced and causing a short communication delay between the CM storage server 102 and the terminal as the storage server 102 which is a candidate from which the CM contents are to be acquired.

The CM storage server selection means 134, for example, inquires to the CM storage server 102 about the CM group information of CM contents to be stored in advance, and stores information about which CM storage server 102 has stored the CM contents of which CM group. In one embodiment, the CM storage server selection means 134 refers to the information and selects the CM storage server 102 that has stored CM contents corresponding to the CM group information to be reproduced. In one embodiment, an external database keeps information about which CM storage server has stored the CM contents of which CM group. The CM storage server selection means 134 may refer to the database to select the CM storage server 102 that has stored CM contents corresponding to the CM group information to be reproduced.

In one embodiment, the CM storage server selection means 134, for example, checks the number of available sessions (the number of remaining sessions) of the CM storage server 102. A CM storage server 102 having a number of remaining sessions is considered to have a performance margin. Then, the CM storage server selection means 134 selects the CM storage server 102 having a number of remaining sessions from the CM storage servers 102 that have stored CM contents corresponding to the CM group information to be reproduced as the CM acquisition source. In another embodiment, the CM storage server selection means 134 can select the CM storage server 102 causing a short delay in communication based on the delay in communication between CM storage server 102 and the CM storage servers 102 as the CM acquisition source.

The CM storage server selection means 134, for example, sends a ping to the CM storage server 102 and checks the response time. In one embodiment, the CM storage server selection means 134 transmits a trace-route datagram to the CM storage server 102 and checks the number of hops between the reproduction terminal 103 and CM storage server 102. The CM storage server selection means 134 may execute a unique transaction between the reproduction terminal 103 and CM storage server 102 and acquire the transaction time. The CM storage server selection means 134 estimates the delay in communication based on the ping time, number of hops, or transaction time and, based on the estimation results, selects the CM storage server 102 that causes the shortest delay in communication as the CM storage server 102 from which the CM contents are to be acquired.

Furthermore, if the reproduction terminal 103 is a movable terminal, the CM storage server selection means 134 can estimate the delay in communication using the position management information of the reproduction terminals 103. The position management information can be acquired, for example, at the time of registering the position of the reproduction terminals 103 at a base station. The CM storage server selection means 134 has the positional information of each CM storage servers 102 in advance. The CM storage server selection means 134 checks the position of the reproduction terminals 103 with the stored positional information of the CM storage servers 102. The CM storage server selection means 134 assumes the CM storage server 102 at the shortest distance from the reproduction terminal 103 as the CM storage server 102 causing the shortest delay in communication, and selects such a CM storage server 102 as the CM storage server 102 from which the CM contents are to be acquired.

Figure 7:
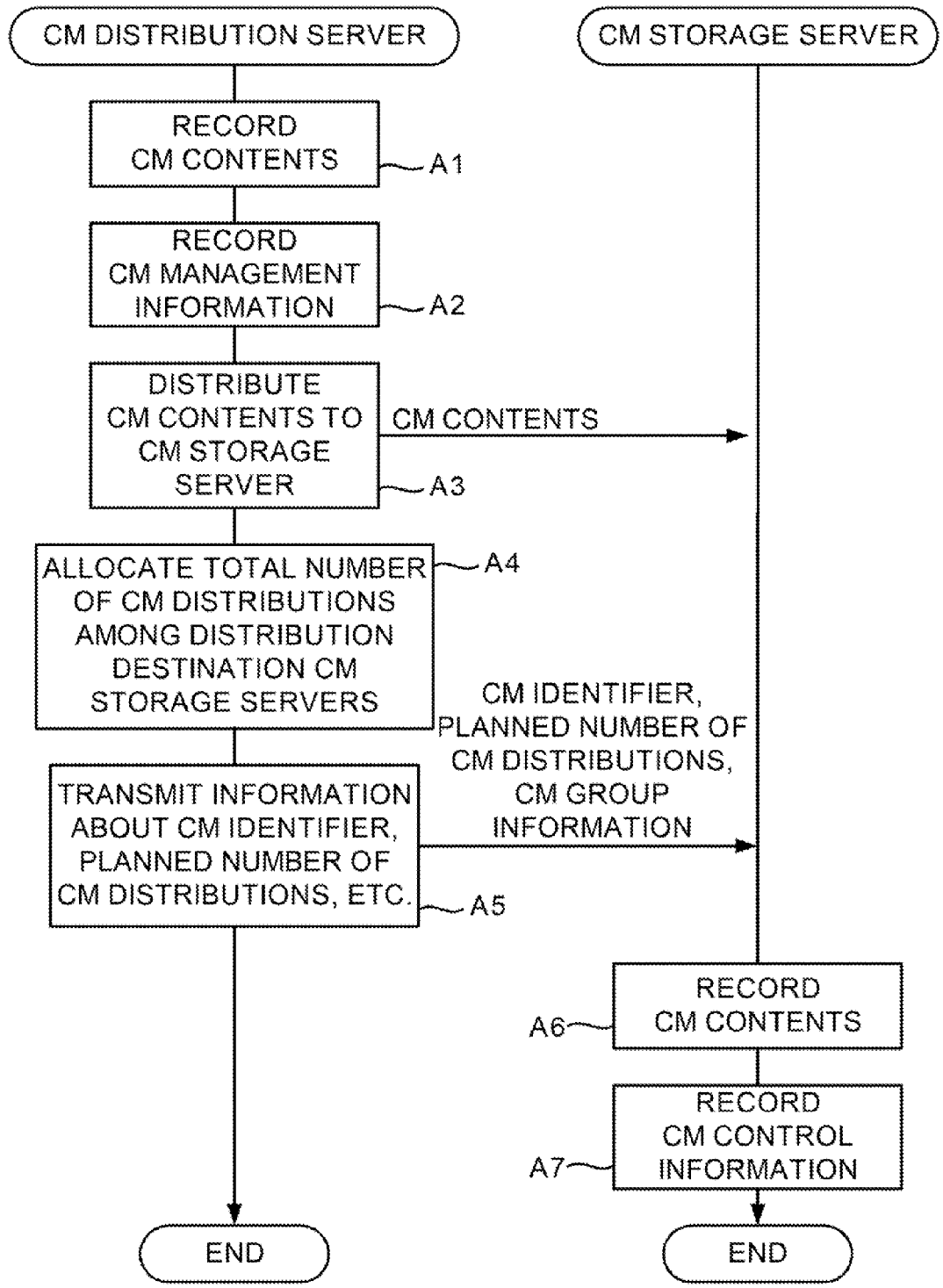
[FIG. 7] A sequence diagram illustrating the operation sequence of the CM distribution to a CM storage server.

FIG. 7 illustrates the operation procedure of CM distribution to the CM storage server 102. The CM record means 111 of the CM distribution server 101 (FIG. 2) records CM contents in the CM contents memory 113 (Step A1). Furthermore, the CM record means 111 records the CM management information 201 (FIG. 3) of the recorded contents in the CM management information memory 114 (Step A2). The CM record means 111 generates a new entry in the CM management information 201 in Step A2 and records the CM identifier, total number of distributions, and the CM group information in that entry.

The CM distribution means 112 distributes the CM contents recorded in the CM contents memory 113, to the CM storage server 102 (Step A3). In doing so, the CM distribution means 112 acquires the CM identifier, the total number of CM distributions, and the CM group information of the distributed contents from the CM management information storage 114. The CM distribution means 112 allocates the total number of CM distributions among the CM storage servers 102 to which the CM contents are to be distributed, to determine the planned number of CM distributions of each of CM storage servers 102 to which the CM contents are to be distributed (Step A4). The CM distribution means 112 sends the CM identifier, the planned number of CM distributions, and the CM group information, to each of CM storage servers 102 (Step A5).

The CM storage means 121 of each of CM storage servers 102 stores the CM contents distributed in Step A3 in the CM contents storage 126 (Step A6). Furthermore, the CM storage means 121 records the CM control information 301 (FIG. 5) of the CM contents stored in Step A6, in the CM control information memory 127 (Step A7). The CM storage means 121 generates a new entry in the CM control information 301 in Step A7 and records the CM identifier, the planned number of CM distributions, and the CM group information that are sent in Step A5 in that entry.

Figure 8:
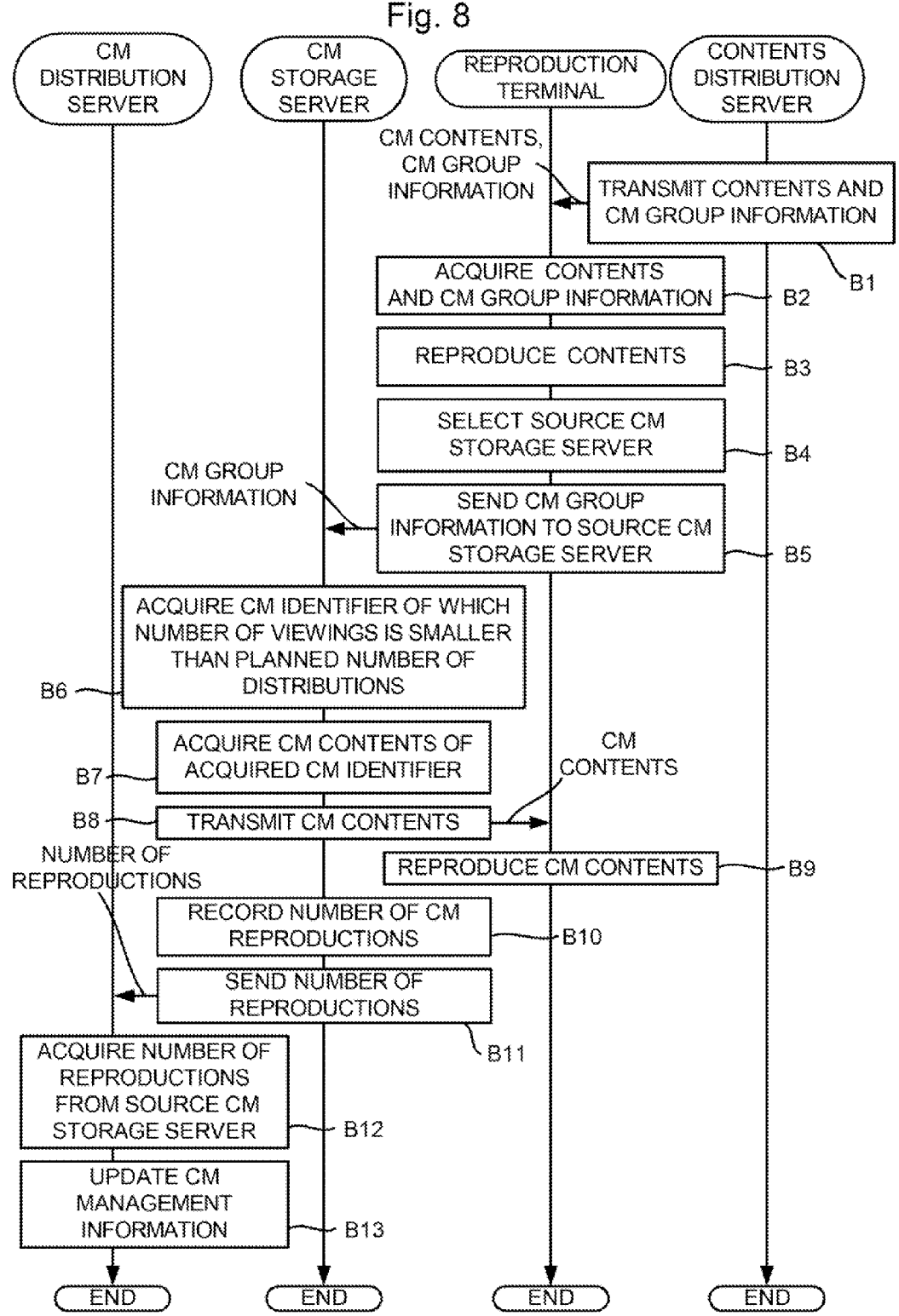
[FIG. 8] A sequence diagram illustrating the operation sequence of the contents reproduction at a reproduction terminal.

FIG. 8 illustrates the operation procedure of viewing contents at each of reproduction terminals 103. Each of reproduction terminals 103 registers the terminal in the CM storage server 102 and contents distribution server(s) 104 as a terminal receiving contents in advance. The contents distribution server 104 transmits to the registered reproduction terminal(s) 103 the contents and the CM group information of CM contents to be reproduced in reproducing of the contents (Step B1). The contents acquisition means 131 of each of reproduction terminals 103 (FIG. 6) acquires the contents and the CM group information from the contents distribution server(s) 104 (Step B2).

The contents reproduction means 133 reproduces the contents acquired by the contents acquisition means 131 (Step B3). The CM storage server selection means 134 selects a CM storage server 102 having a number of available sessions or causing short delay in communication with the reproduction terminal 103 from the CM storage servers 102 that store CM contents corresponding to the CM group information, from the contents storage server 102 as the CM storage server 102 from which the CM contents are to be acquired (Step B4). The delay in communication between the reproduction terminal 103 and a CM storage server 102 can be estimated based on the ping time, the number of hops, the transaction time, or the position management information of the reproduction terminal 103.

The CM acquisition means 132 sends the CM group information received from the contents distribution server(s) 104 to the CM storage server 102 selected in Step B4 (Step B5). If each of reproduction terminals 103 has any preference information, the CM acquisition means 132 also sends the preference information to the CM storage server 102. The CM group information and preference information can be information specifying no group and/or preference or any group and/or preference.

Receiving the CM group information, the CM transmission means 123 of each of CM storage servers 102 acquires the CM identifier of the CM group information matching the received CM group information, from the CM control information memory 127 (CM control information 301 (FIG. 5)) (Step B6). In this step, the CM transmission means 123 acquires the CM identifier of CM contents of which the number of viewings is smaller than the planned number of CM distributions in the CM control information 301.

The CM transmission means 123 acquires the CM contents of the CM identifier acquired in Step B6 from the CM contents storage 126 (Step B7). If multiple CM identifiers are acquired in Step B6, the CM transmission means 123 selects one CM identifier from those multiple CM identifiers based on the preference information received from the reproduction terminal 103. Otherwise, the CM transmission means 123 may select any one CM identifier from multiple CM identifiers acquired in Step B6.

The CM transmission means 123 transmits the CM contents acquired in Step B7 to the reproduction terminals 103 (Step B8). In doing so, the CM transmission means 123 also transmits the CM identifier of the CM contents to transmit to the reproduction terminals 103. The contents reproduction means 133 of the reproduction terminal 103 reproduces the CM contents transmitted in Step B8 in addition to the contents transmitted in Step B1 (Step B9). In one embodiment, the timing of reproducing the CM contents is specified by the contents distribution server 104. In another embodiment, the timing of reproducing the CM contents is generated by the contents reproduction means 133.

The number of reproductions count means 124 of each of CM storage servers 102 counts the number of reproductions of each of CM contents transmitted from each of CM storage servers 102 to the reproduction terminal 103. In one embodiment, the number of reproductions count means 124 increments the number of reproductions by each time when the CM transmission means 123 transmits CM contents. In another embodiment, the number of reproductions count means 124 receives the CM identifier of a reproduced CM contents and the number of reproductions from the reproduction terminals 103, and the reproduction count means 124 increases the number of reproductions of the CM contents corresponding to the CM identifier by the number of reproductions. The number of reproductions count means 124 records the number of reproductions in the number of viewings, in the CM control information 301 (Step B 10).

The reproduction information transmission means 125 transmits the number of viewings in the CM control information 301, in other words the number of times the CM storage server 102 makes the reproduction terminals 103 reproduce the contents, to the CM distribution server 101 (Step B11). In one embodiment, the reproduction information transmission means 125 transmits the number of reproductions for each time when the CM control information 301 is updated. In another embodiment, the reproduction information transmission means 125 may periodically transmit the number of reproductions at given intervals.

The CM distribution means 112 of the CM distribution server 101 receives the number of reproductions of the CM contents that were distributed from the CM storage servers 102 to which the CM contents were to be distributed (Step B12). The CM distribution means 112, for example, receives the number of reproductions from each of the CM storage servers 102-1 and 102-2 when CM distribution means 112 has distributed CM contents to the CM storage servers 102-1 and 102-2 in Step A3 of FIG. 7. The CM distribution means 112 updates the number of viewings in the CM management information 201 (FIG. 3) based on the received number of reproductions (Step B13).

When the number of viewings reaches to the planned number of CM distributions in the CM control information 301 for each CM storage server 102, that CM storage server 102 stops distributing the CM content that has reached the planned number of CM distributions. Therefore, in such a case, the CM content and related information can be deleted from the CM contents storage 126 and CM control information memory 127. With regard to the CM distribution server, similarly, when the number of viewings reaches the total number of CM distributions in the CM management information 201, the distribution of that CM content ends. Therefore, each of CM distribution servers 101 that reach the number of viewings for a CM content may delete the CM contents and the information about the CM contents from the CM contents memory 113 and CM management information memory 114.

In this embodiment, the CM distribution server 101 stores the CM management information 201 (FIG. 3) including the information about total distribution quantity (total number of distributions) presenting the quantity of CM contents to be distributed, to be reproduced at the reproduction terminal 103, in the CM management information memory 114 (FIG. 2). For distributing CM contents to the CM storage servers 102, each of CM distribution servers 101 sends the number of planned distributions (information about planned distribution quantity (times)) obtained by allocating the total number of distributions of the CM contents among the CM storage servers 102 to which the CM contents are to be distributed, to the CM storage servers 102 to which the CM contents are to be distributed. Each of CM storage servers 102 stores the CM contents distributed from the CM distribution server(s) 101 and records the planned number of distributions in the CM control information memory 127 (FIG. 4) recording the CM control information 301 (FIG. 5) including the planned number of distributions and the number of viewings. Each of CM storage servers 102 counts the number of reproductions (the reproduced quantity (times)) of the CM contents distributed from the CM storage server to the reproduction terminal 103 and records the number in the CM control information memory 127. Each of CM storage servers 102 distributes the CM contents to the reproduction terminal(s) 103 until the total number of reproductions for each of the CM contents reaches at least the planned number of distributions.

In one embodiment, each of the CM distribution servers 101 allocates the total number of CM distributions among the CM storage servers 102 to which the CM contents are to be distributed. Each CM storage server 102 distributes the CM contents to the reproduction terminal(s) 103 until the number of reproductions at the reproduction terminal(s) 103 reaches the planned number of CM distributions distributed by the CM distribution server 101. Each of the CM storage servers 102 makes the reproduction terminal(s) 103 reproduce the CM contents of the planned number of CM distributions distributed to the CM storage server; then, the CM contents of the total number of CM distributions is reproduced at the reproduction terminals 103 as a whole.

This embodiment makes it possible that the CM contents recorded in each of CM distribution servers 101 is distributed to multiple CM storage servers 102 and the multiple CM storage servers 102 distribute the CM contents to the reproduction terminal(s) 103. Using multiple CM storage servers 102, the processing load of CM distribution can be shared. Compared with the case in which the CM distribution server 101 directly distributes CM to the reproduction terminal(s) 103, the processing load of each of CM distribution servers 101 can be reduced. Furthermore, each of reproduction terminals 103 selects a CM storage server 102 having a number of available sessions or causing short delays in communication, from multiple CM storage servers 102 as the CM acquisition source; then, short processing delay in CM distributions can be realized. In other words, CM distribution with a planned number of times and reducing the processing workload of each CM distribution servers 101 can be performed together.

Figure 9:
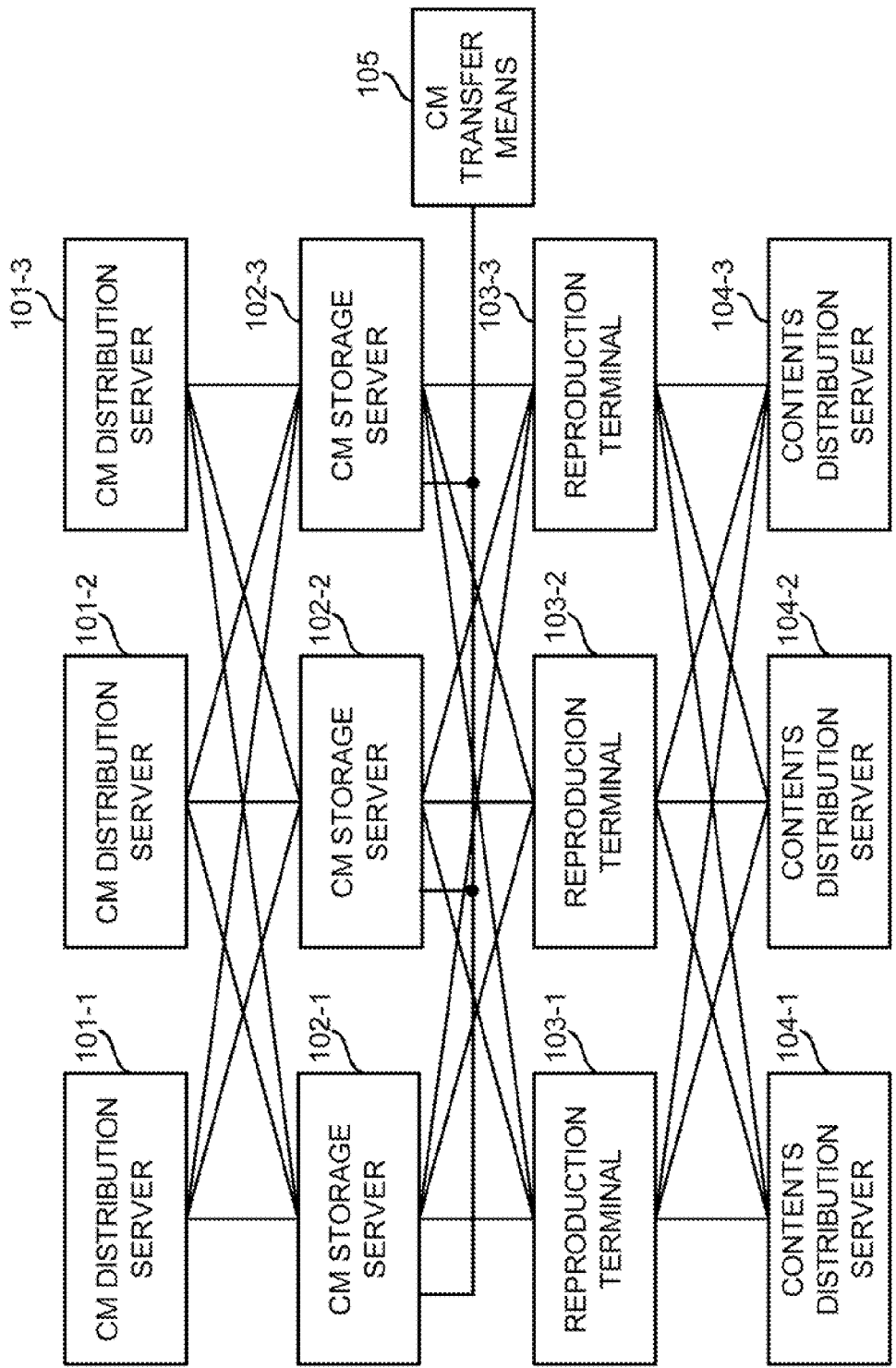
[FIG. 9] A block diagram illustrating the contents distribution system of Embodiment 2 of the present invention.

FIG. 9 illustrates the contents distribution system of Embodiment 2 of the present invention. The contents distribution system (CM distribution system) of this embodiment is different from the CM distribution system of Embodiment 1 shown in FIG. 1 in that a CM transfer means (contents transfer means) 105 is added. The CM transfer means 105 executes the CM transfer procedure that transfers the planned number of CM distributions allocated to a CM storage server (s) 102 from which the CM contents are to be acquired, to a CM storage server(s) 102 to which the CM contents are to he transferred. The CM storage server from which the CM contents are to be transferred 102 is any one of multiple CM storage servers 102. At least one CM storage server 102 out of multiple CM storage servers 102 can be candidates, except for the source CM storage server 102. The selected candidates of the at least one CM storage servers 102 are designated for which the CM contents are to be transferred. The CM transfer means 105 can be provided in each of CM storage servers 102 or in each of CM distribution servers 101. Furthermore, the CM transfer means 105 can be divided on the basis of functions and some functions can be provided in the CM storage server 102 and the remaining functions can be provided in the CM distribution server 101.

The CM transfer means 105 refers to the CM control information 301 (FIG. 5) of the transfer source CM storage server 102 (CM transferor, content transferor) and calculates the remaining number of distributions of the transfer source CM storage server 102 from the planned number of distributions and the number of viewings. Furthermore, the CM transfer means 105 refers to the CM control information 301 of candidates which are CM storage servers 102 to which the CM content is to be transferred (CM receiver, content receiver), and calculates the remaining number of distributions of each of CM storage servers 102 which are the CM content is to be transferred, from the number of planned distributions and the number of viewings. In one embodiment, the remaining number of distributions can be the remaining number of distributions of the CM content having a particular CM identifier or the remaining number of distributions of the CM content having particular CM group information. In another embodiment, the CM storage server 102 stores the remaining number of distributions of all CM contents. The timing of acquiring the remaining number of distributions can be determined on an arbitrary basis. The remaining number of distributions may be acquired responding to instructions from the CM distribution server 101 or responding to instructions from the reproduction terminal 103.

The CM transfer means 105 compares the remaining numbers of distributions of CM storage servers 102 from which the CM contents are to be transferred with the remaining numbers of distributions from candidates which are CM storage servers 102 from which the CM contents are to be transferred. Based on the comparison of the results of the remaining numbers, the CM transfer means 105 transfers at least some of the remaining numbers of distributions (quantity) to at least one of the CM storage servers 102 which is a candidate to which at least a part of the remaining number of distributions (quantity) are to be transferred. More specifically, the CM transfer means 105 determines to transfer of CM content if the remaining number of distributions of the CM storage server 102 from which the CM content is to be transferred, is greater than the remaining number of distributions of candidates which are CM storage servers 102 to which the CM content are to be transferred and the difference is equal to or greater than a given threshold. The CM transfer means 105 transfers at least part of the remaining number of distributions of the storage server 102 associated with the CM transfer means 105 to at least one of CM storage servers 102 which are candidates to which at least part of the distribution quantity to be transferred.

The CM transfer means 105 reduces the planned number of distributions of the CM control information 301 of the CM storage server 102 by the number to transfer to the CM storage servers 102 to which the CM content is to be transferred. Furthermore, the CM transfer means 105 increases the planned number of distributions in CM control information of the CM storage server 102 to which the CM content is to be transferred, by a number designating the transfer of CM content to be transferred from each of the CM storage servers 102. Here, one embodiment shows an example of the way to transfer the remaining numbers of distributions by comparing values; however, in another embodiment, another way of CM transfer that uses quantifying criterion for the amount of CM contents to be distributed is used, such as using the remaining number of distributions.

Here, the remaining numbers of distributions compared in the CM transfer procedure are the remaining number of distributions of contents distributed from the same CM distribution server 101. When acquisition source CM distribution servers 101 are different, the CM transfer means 105 neither compares the remaining number of distributions nor transfers any CM contents distribution even if the CM identifiers are the same. For example, it is assumed that the acquisition source of the CM contents having a CM identifier 001 in the CM storage server 102 from which the CM content is to be transferred is a CM distribution server 101-1. The CM transfer means 105 acquires the remaining number of distributions of the CM content having the CM identifier 001 and distributed from the CM distribution server 101-1 in CM storage servers 102 which are candidates to which the CM content is to be transferred. The remaining number of distributions of the CM content having the CM identifier 001 and distributed from the CM distribution server 101-2 is not acquired even if such content is stored in the CM storage servers 102 which are candidates to which the CM content is to be transferred.

Figure 10:
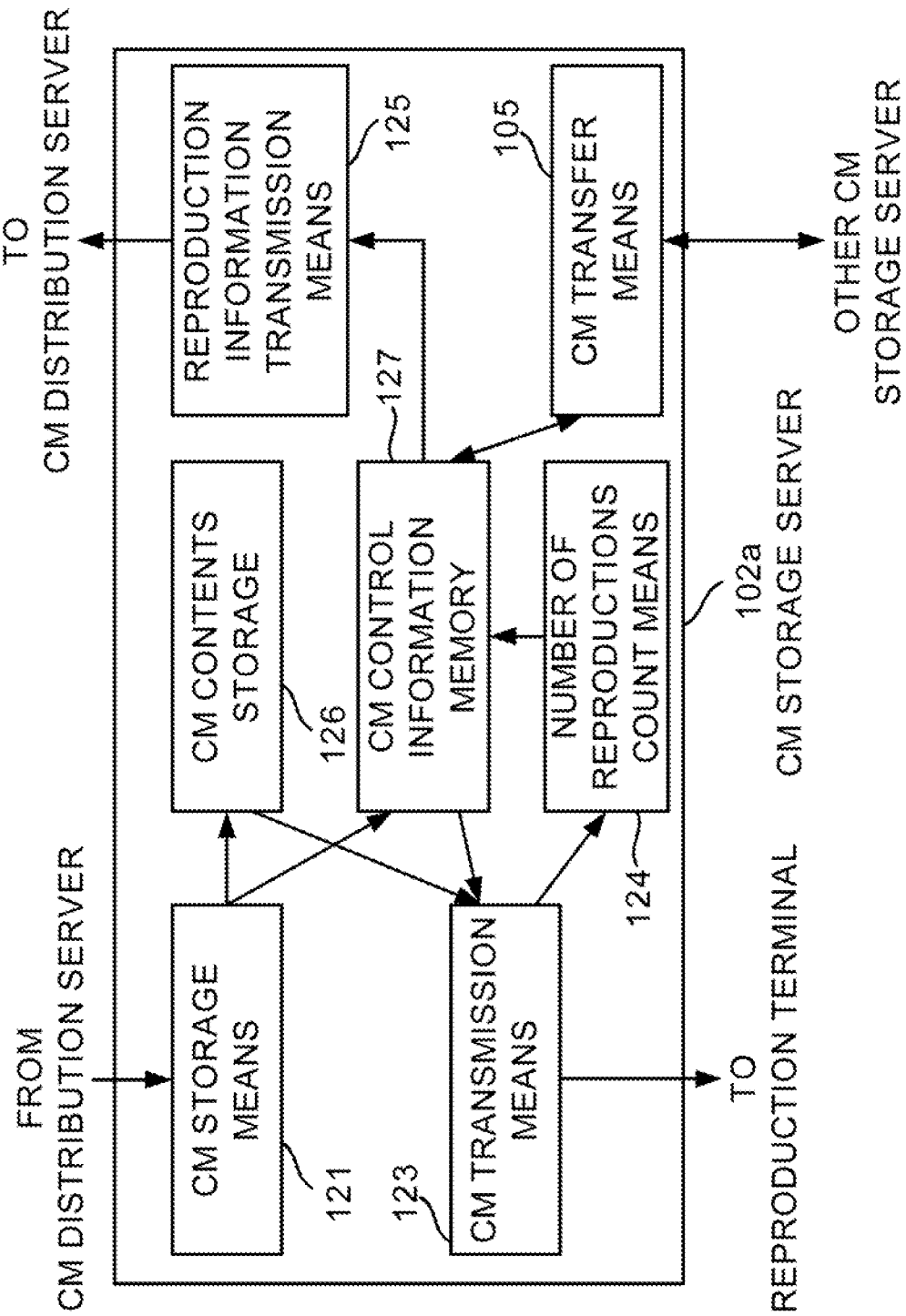
[FIG. 10] A block diagram illustrating a CM storage server having the CM transfer means.

FIG. 10 illustrates the configuration of each of CM storage servers 102a having the CM transfer means 105. Each CM storage server 102a has the CM transfer means 105 in addition to the configuration of Embodiment 1 shown in FIG. 4. The CM transfer means 105 refers to the CM control information memory 127 to acquire "the planned number of distributions" and "the number of viewings" in the CM control information 301 (FIG. 5). Calculating the remaining number of distributions of a particular CM content, the CM transfer means 105 acquires the planned number of distributions and the number of viewings of the CM identifier of interest and set the remaining number of distributions to "the planned number of distributions—the number of viewings". Calculating the remaining number of distributions of particular CM group information, the CM transfer means 105 obtains the total planned number of distributions and total number of viewings of the entries having the CM group information and sets the remaining number of distributions as a difference.

The CM transfer means 105 requests the CM transfer means 105 of other CM storage servers 102a to transmit the remaining number of distributions. At this time, the CM transfer means 105 can send a remaining number of distributions from the CM storage server associated with the CM transfer means 105 at the same time as the transmission request. Requesting transmission of the remaining number of particular contents, the CM transfer means 105 sends the CM identifier of the CM content of interest to the other CM storage servers 102a. Requesting transmission of the remaining number of distributions of CM content of particular CM group information, the CM transfer means 105 sends the CM group information of interest to the other CM storage servers 102a.

Receiving the request for transmit the remaining number of distributions from another CM storage server 102a, the CM transfer means 105 refers to the CM control information memory 127 to acquire "the planned number of distributions"

and "the number of viewings" in the CM control information 301 (FIG. 5). When the CM transfer means 105 is sent a CM identifier from the request source CM storage server 102a, the CM transfer means 105 acquires the planned number of distributions and the number of viewings of that CM identifier and sets the remaining number of the distributions to "the planned number of distributions—the number of viewings". Being sent the CM group information from the request source CM storage server 102a, the CM transfer means 105 obtains the total number of planned distributions and total number of viewings from entries having that CM group information and sets the remaining number of distributions to the difference between the totals. The CM transfer means 105 transmits the remaining number of distributions to the request source CM storage server 102a.

Acquiring the remaining number of distributions from other CM storage server 102a, the CM transfer means 105 compares the remaining number of distributions of the CM storage server associated with the CM transfer means 105 with the remaining number of distributions of an other CM storage server 102a. The CM transfer means 105 determines whether the number calculated by subtracting the number of remaining distributions of the other CM storage server 102a from the remaining number of distributions of the CM storage server associated with the CM transfer means 105 is greater than a given threshold. If the remaining number of distributions is larger than the remaining number of distributions of the other CM storage server 102a and difference between these numbers is equal to or greater than the given threshold, the CM transfer means 105 determines to transfer the CM content distribution from CM storage server 102 to the other CM storage server 102a. One or more CM storage servers can be the destination of transfer.

If the remaining number of distributions is for a particular CM content, the CM transfer means 105 selects that CM content as the CM content to he transferred. On the other hand, when the remaining number of distributions is for CM contents of particular CM group information, the CM transfer means 105 selects any CM content among the CM contents of the particular CM group information as the CM contents to be transferred. The CM contents to be transferred can be selected by referring to the remaining number of distributions of each CM contents or the elapsed time since the CM contents are stored. CM contents having a large remaining number of distributions or having a long elapsed time since the storage can be selected as the transfer object.

The CM transfer means 105 reduces the planned number of distributions in the CM control information 301 by the number to transfer. Furthermore, the CM transfer means 105 sends the number to transfer to the CM transfer means 105 of the CM storage server 102a to which the CM content is to be transferred. The CM transfer means 105 of the CM storage server 102a to which the CM content is to be transferred increases the planned number of distributions in the CM control information 301 by the informed number to transfer. If the CM storage server 102a to which the CM content is transferred has not stored the CM content to be transferred, the CM transfer means 105 of the CM storage server 102a from which the CM content is to be transferred transmits the CM content to be transferred to the CM storage server 102a to which the CM content is to be transferred. The CM storage means 121 of the CM storage server 102a to which the CM content is to be transferred stores the CM content to be transferred in the CM contents storage 126.

Figure 11:
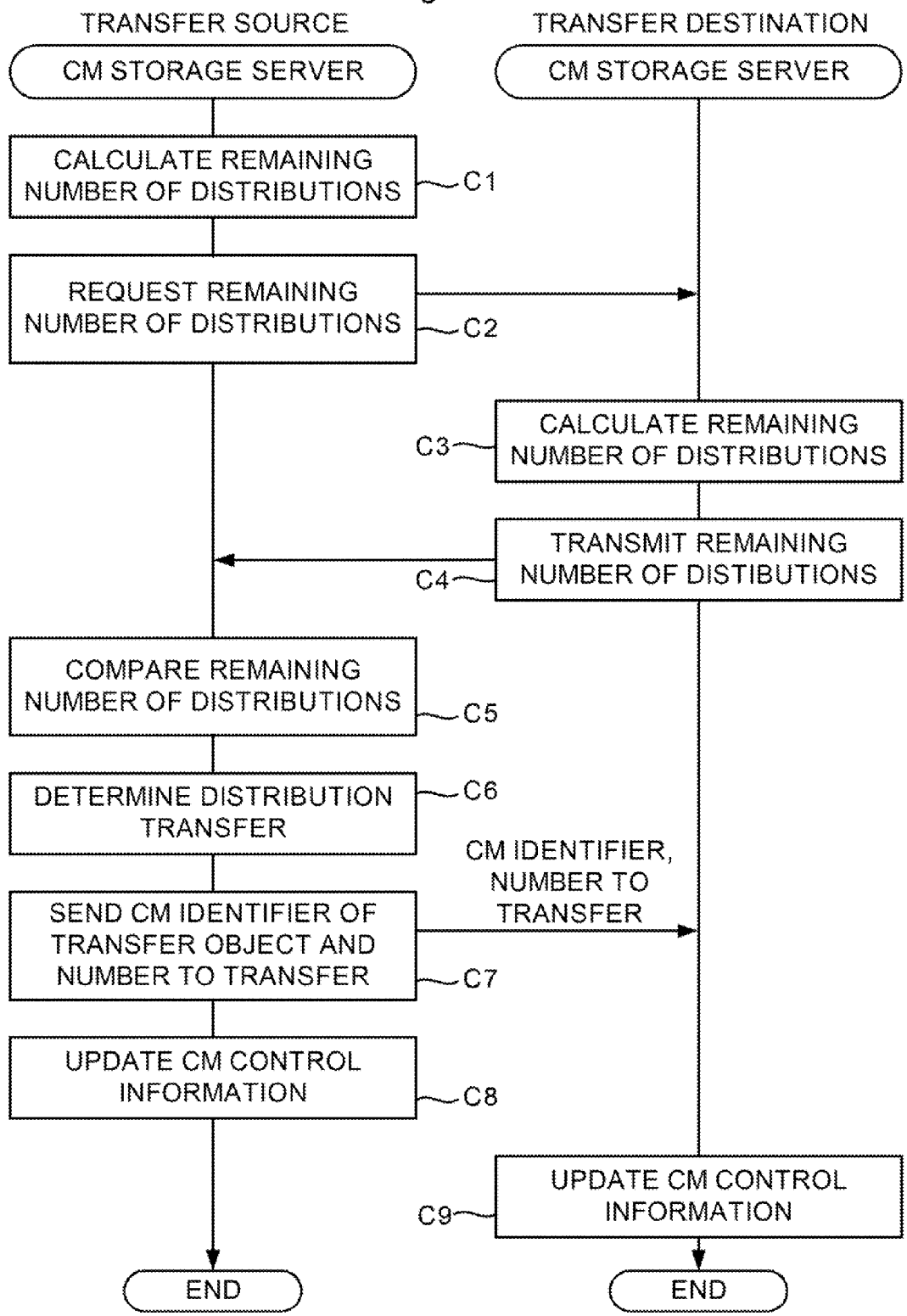
[FIG. 11] A sequence diagram illustrating the sequence of the CM transfer process.

FIG. 11 illustrates the CM transfer procedure. The CM transfer means 105 refers to the CM control information memory 127 and calculates the remaining number of distributions of the CM storage server 102 associated with the CM transfer means 105 (Step C1). Furthermore, the CM transfer means 105 requests other CM storage servers 102a (candidate transfer destinations) to transmit the remaining number of distributions (Step C2). The CM transfer means 105 of each CM storage server 102a which are candidates to which the CM content is to be transferred refers to the CM control information memory 127 and calculates the remaining number of distributions of the CM storage server 102 associated with the CM transfer means 105 (Step C3). The CM transfer means 105 transmits the remaining number of distributions calculated in Step C3 to the request source CM storage server 102a (Step C4).

The CM transfer means 105 compares the remaining number of distributions of the CM storage server associated with the CM transfer means 105 that is calculated in Step C1 with the remaining number of distributions acquired in step C4 of each CM storage servers 102a which are candidates to which the CM content is to be transferred (Step C5). When remaining number of distributions of the CM storage server associated with the CM transfer means 105 is greater than the remaining number of distributions of other CM storage servers 102a and the differences are equal to or greater than a given threshold, the CM transfer means 105 determines to transfer the CM content to the other CM storage servers 102a (Step C6). When the remaining number of distributions of the CM storage server associated with the CM transfer means 105 is smaller than the remaining number of distributions of other CM storage servers 102a or the differences are smaller than the given threshold, the CM transfer means 105 does not transfer the CM content and ends the procedure.

Determining to transfer the CM content, the CM transfer means 105 sends the CM identifier of the CM content to be transferred and the number of transfer to CM storage servers 102a to which the CM content is to be transferred (Step C7). If some of CM storage servers 102a to which the CM content is to be transferred don't store the CM content of interest, the CM transfer means 105 also transmits the CM content. Sending the CM identifier of the CM content to be transferred and the number to transfer, the CM transfer means 105 reduces the planned number of distributions recorded in the CM control information memory 127 by the number to transfer (Step C8).

The CM transfer means 105 of the other CM storage server 102a (destination of transfer) that is informed of the CM transfer increases the planned number of distributions stored in the CM control information memory 127 by the number to transfer (Step C9). Furthermore, receiving the CM content from the CM storage server 102a from which the CM content is to be transferred, the CM transfer means 105 stores the received CM content in the CM contents storage 126. By decreasing the planned number of distributions of the CM storage server 102a from which the CM content is to be transferred and increasing the planned number of distributions of the CM storage servers 102a to which the CM content is to be transferred, the CM contents distribution to the reproduction terminal(s) 103 is transferred to CM storage servers 102a to which the CM content is to be transferred. The CM storage server 102a to which the CM content is to be transferred distributes the CM content until the number of viewings of the reproduction terminal(s) 103 reaches the increased planned number of distributions.

Figure 12:
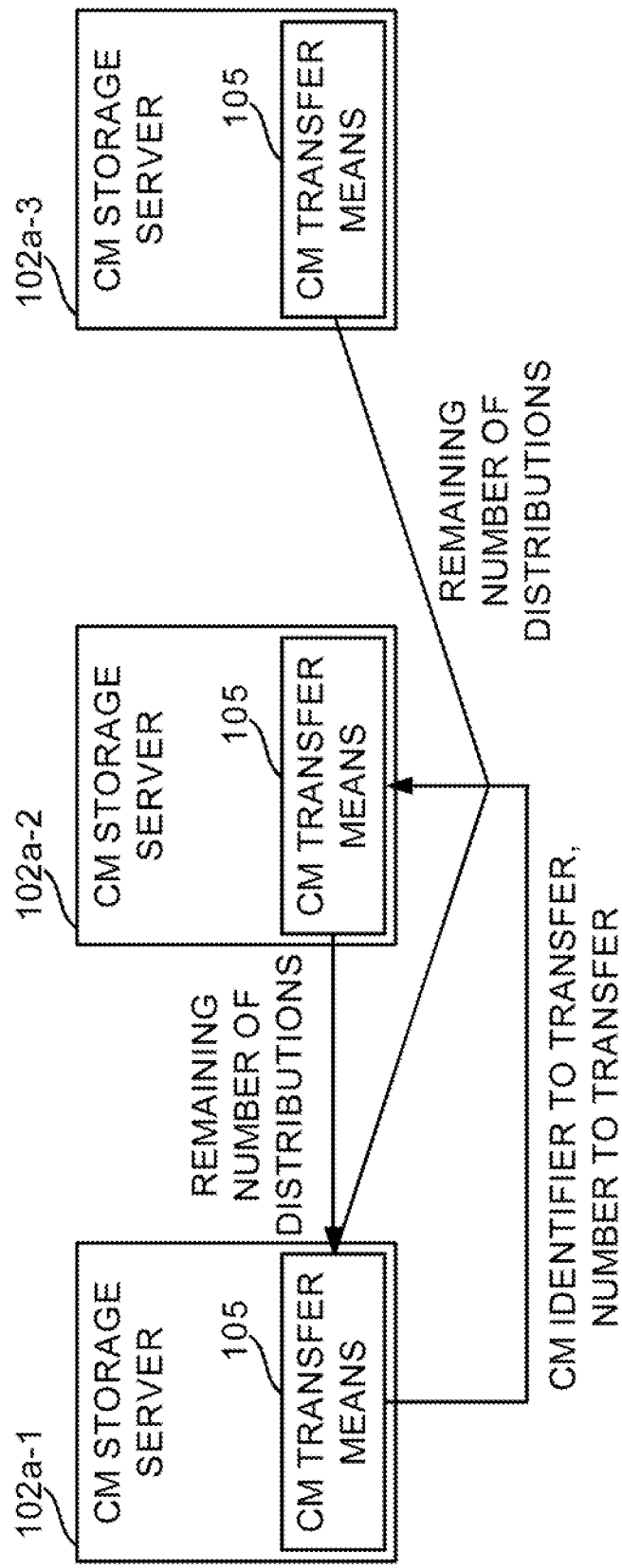
[FIG. 12] A block diagram illustrating a CM transfer when the CM storage server has the CM transfer means.

FIG. 12 illustrates a block diagram illustrating a CM transfer when the CM storage server has the CM transfer means. A case in which a CM storage server 102a-1 acquires the remaining number of distributions of the CM content having a CM identifier 001 from the CM storage servers 102a-2 and 102a-3 and transfers the CM distribution transfer procedure will be described with reference to FIG. 12. The CM storage server 102*a*-1 calculates a remaining number of distributions of the CM content of the CM storage server associated with the CM transfer means 105 having the CM identifier 001 in Step C1. Furthermore, the CM storage server 102*a*-1 sends the CM identifier 001 to the CM storage servers 102*a*-2 and 102*a*-3 and requests transmission of the remaining number of distributions in Step C2.

In one embodiment, the CM storage server 102*a*-2 calculates the remaining number of distributions of the CM identifier 001 in Step C3 and transmits the remaining number of distributions to the request source CM storage server 102*a*-1 in Step C4. In another embodiment, the CM storage server 102*a*-3 calculates the remaining number of distributions of the CM identifier 001 in Step C3 and transmits the remaining number of distributions to the request source CM storage server 102*a*-1 in Step C4. The CM storage server 102*a*-1 acquires the remaining number of distributions of the CM contents having the CM identifier 001 from the CM storage servers 102*a*-2 and 102*a*-3.

FIG. 13 illustrates the CM control information of the CM content having a CM identifier 001 in the CM storage servers 102*a*-1 to 102*a*-3. In the CM storage server 102*a*-1, the planned number of distributions is "50" and the number of viewing is "20"; therefore, the remaining number of distributions is "30." The remaining number of distributions is 50−40=10 in the CM storage server 102*a*-2 and the remaining number of distributions is 50−37=13 in the CM storage server 102*a*-3.

In an embodiment, the CM storage server 102*a*-1 compares the remaining number of distributions of the other CM storage servers 102*a*-2 and 102*a*-3 that are acquired in Step C5 of FIG. 11 with the remaining number of distributions of the CM storage server associated with the CM transfer means 105. In FIG. 13, subtracting the remaining number of distributions of the CM storage server 102*a*-2 from the remaining distribution quantity of the CM storage server 102*a*-1, the difference between is 20. Additionally, subtracting the remaining number of distributions in the CM storage server 102*a*-3 from the remaining number of distributions of the CM storage server 102*a*-1, the difference is 17. If the threshold is "20," the remaining number of distributions of the CM storage server 102*a*-1 is greater than the remaining number of distributions of the CM storage server 102*a*-2 and the difference between the remaining number of distributions of the CM storage server 102*a*-1 and the remaining number of distributions of the CM storage server 102*a*-2 is greater than the threshold, then, the CM storage server 102*a*-1 determines to transfer the CM content having the CM identifier 001 to the CM storage server 102*a*-2.

If the threshold is "15" in the above case, then remaining number of distributions in the CM storage server 102*a*-1 is greater than the remaining number of distributions for both CM storage servers 102*a*-2 and 102*a*-3 and the difference is greater than the threshold. In such a case, any one of the two CM storage servers 102*a*-2 and 102*a*-3 can be selected as the CM storage server 102*a* to which the CM content is to be transferred. In one embodiment, the CM storage server 102*a*-1 selects, for example, the CM storage server 102*a*-2 having a greater difference in the remaining number of distributions as the CM storage server 102-*a* to which the CM content is to be transferred. In another embodiment, for example, the CM storage server 102*a*-1 can select both CM storage servers 102*a*-2 and 102*a*-3 as the CM storage servers to which the CM content is to be transferred and allocates the number to transfer between the CM storage servers 102*a*-2 and 102*a*-3.

The CM storage server 102*a*-1 determines a number to CM transfer. Here, the CM number to transfer is half the number of remaining distributions of the CM storage server 102*a*-1 (15). The CM storage server 102*a*-1 sends the CM identifier 001 and the number to transfer "15" to the CM storage server 102*a*-2 to which the CM content is to be transferred in Step C7. Then, the CM storage server 102*a*-1 decreases the planned number of distributions of the CM content having the CM identifier 001 in the CM control information by the CM number to transfer by "15" in Step C8. Also, the CM storage server 102*a*-2 to which the CM content is to be transferred increases the planned number of distributions of the CM contents having the CM identifier 001 in the CM control information by the number to CM transfer by "15" in Step C9.

FIG. 14 illustrates the CM control information of the CM contents having the CM identifier 001 in the CM storage servers 102*a*-1 to 102*a*-3 after the CM transfer. The planned number of distributions of the CM storage server 102*a*-1 after the transfer is 50−15=35 and, then, the remaining number of distributions is 35−20=15. And, the planned number of distributions of the CM storage server 102*a*-2 is 50+15=65 and the remaining number of distributions is 65−40=25. Transferring CM content distribution from the CM storage server 102*a*-1 having the greater remaining number of distributions to the CM storage server 102*a*-2 having the smaller remaining number of distributions, the remaining numbers of distribution among the CM distribution servers 102*a* are equalized, that is, for example divided equally among the servers. Furthermore, the CM distribution server 102*a*-2 to which the CM content is to be transferred is a server distributing the more number of CM content having the CM identifier 001 to reproduction terminals 103; therefore, the CM content can efficiently be distributed.

Figure 15:
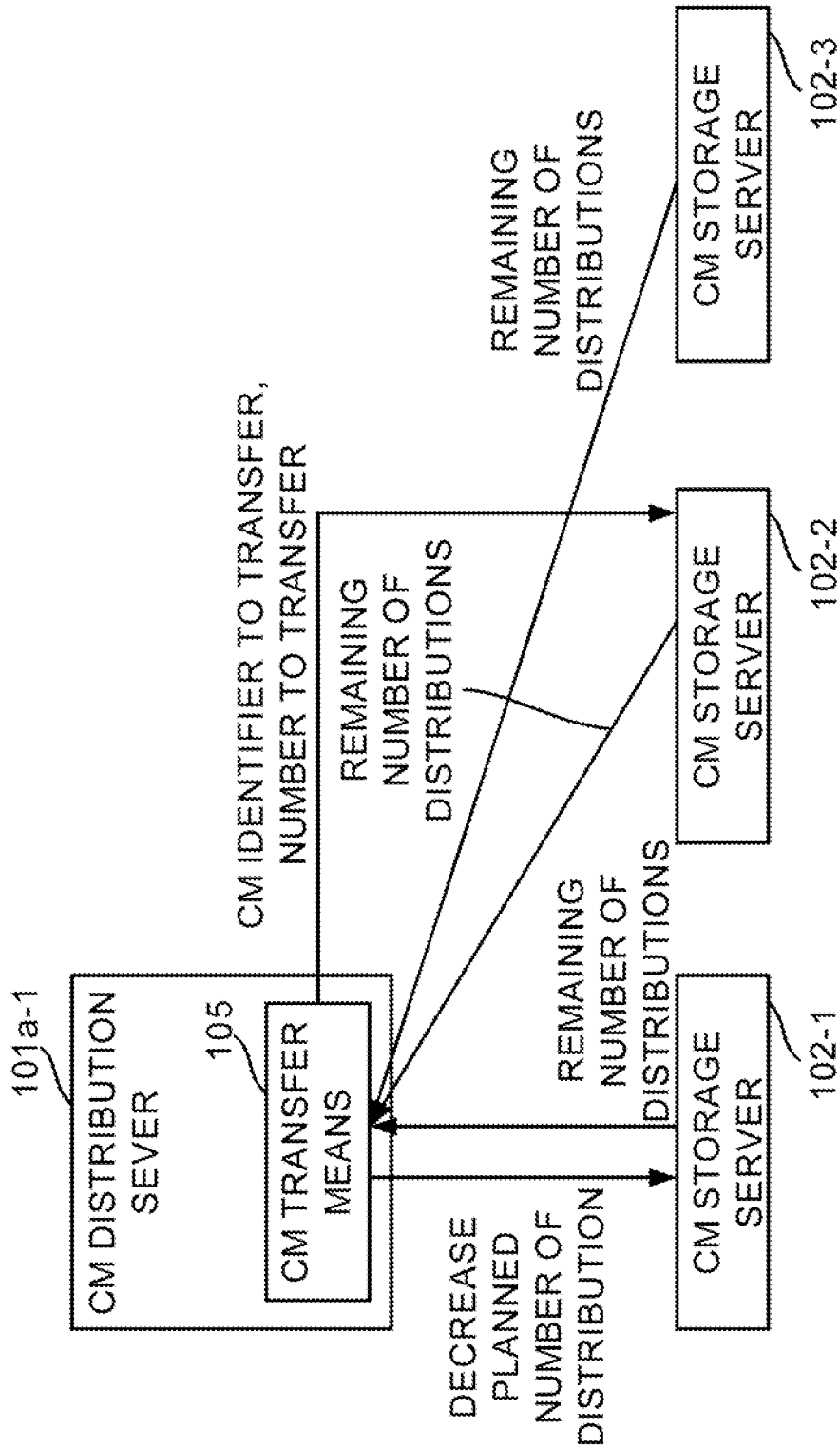
[FIG. 15] A block diagram illustrating a diagram of the CM transfer when the CM distribution server has the CM transfer mean's.

In the above description, each CM storage server has the CM transfer means 105. The configuration that CM distribution server 101 has the CM transfer means 105 can also work. FIG. 15 illustrates the shape of the CM transfer procedure in such configuration. The CM distribution server 101*a*-1 (CM transfer means 105) collects the remaining number of distributions of the CM contents having the CM identifier 001 from the CM storage servers 102-1 to 102-3. The timing of acquiring the remaining number of distributions can be determined with an arbitrary basis. The CM distribution server 101*a* can acquire the remaining number of distributions spontaneously or by responding to instructions from the CM storage server 102 or the reproduction terminal 103. The CM distribution server 101*a*-1 can acquire the remaining number of distributions after selection of the transfer destination CM storage server 102 or can select the transfer source and transfer destination based on the acquired remaining number of distributions.

If the remaining number of distributions of the CM storage server 102 from which the CM content is to be transferred is greater than the remaining number of distributions of CM storage servers 102 which are candidates to which the CM contents is to be transferred and the differences are equal to or greater than the threshold, then the CM distribution server 101*a*-1 determines to transfer at least part of the remaining number of distributions of the CM storage server 102, to other CM storage servers 102. The CM distribution server 101*a*-1 sends the number to transfer to the CM storage server 102-1 from which the CM content is to be transferred and decreases the planned number of distributions of the CM identifier 001 in the CM control information 301 (FIG. 5) by the number to transfer to the other CM storage servers 102. Furthermore, the CM distribution server 101*a*-1 sends the number to transfer to CM storage servers 102-2 to which the CM content is to be transferred and increases the planned number of distributions of the CM identifier 001 in the CM control information 301 by the transfer quantity.

In one embodiment, for example, If the CM storage server 102-2 to which the CM content is to be transferred does not store the CM contents to be transferred; the CM distribution server 101a-1 distributes the transfer CM content to be transferred to the CM storage server 102-2 to which the CM content is to be transferred. If the CM distribution server 101a-1 does not store the transfer object CM content, the CM distribution server 101a-1 acquires the CM content of interest from the CM storage server 102-1 from which the CM content is to he transferred and distributes the CM content to the CM storage server 102-2 to which the CM content is to be transferred. In another embodiment, the CM distribution server 101a-1 instructs the transfer source CM storage server 102-1 to transmit the transfer object CM content to the CM storage server 102-2 to which the CM content is to be transferred.

In the above description, the CM distribution server 101a-1 has the CM transfer means 105. In one embodiment, the CM distribution server 101a-1 controls the CM transfer means 105. In another embodiment, the CM distribution server controls the CM transfer means 105. Thus, the CM transfer procedure can be executed by multiple CM distribution servers. Thereby, in one embodiment, the CM distribution server that executes transfer procedures can be switched depending on the CM contents or CM group.

Figure 16:
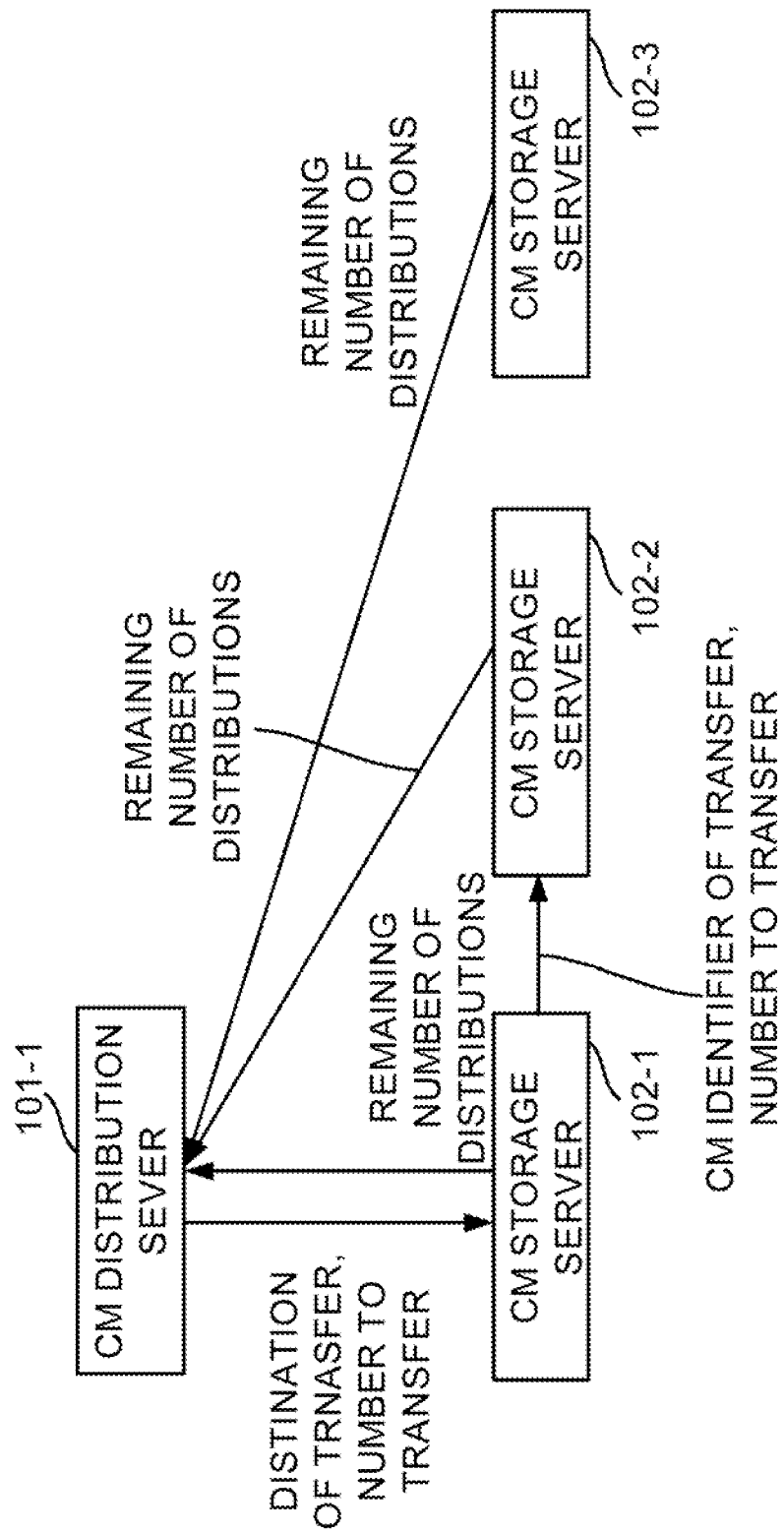
[FIG. 16] A block diagram illustrating a diagram of the CM transfer flow when the functions of CM transfer means are divided between the CM distribution server and CM storage server.

Parts of the functionality of the CM transfer means 105 may be performed by one or more CM distribution servers 101 and the remaining functionality may be performed by one or more CM storage servers 102. FIG. 16 illustrates the transfer flow in such a case, where in this embodiment, each of the CM distribution servers 101 and each of the CM storage servers 102 have some functions of the CM transfer means 105.

The CM distribution server 101-1 collects the remaining number of distributions of the CM content having the CM identifier 001 from the CM storage servers 102-1 to 102-3. This functionality is the same as performed by the CM transfer means 105 provided in the CM distribution server 101a-1 (FIG. 15). The timing of acquiring the remaining number of distributions can be determined on an arbitrary basis. The CM distribution server 101 can acquire the remaining number of distributions spontaneously or with responding to instructions from the CM storage server 102 or the reproduction terminal 103. The CM distribution server 101 can acquire the remaining number of distributions after selection of the transfer destination CM storage server 102 or can select the transfer source and transfer destination based on the acquired remaining number of the distributions.

If the remaining number of distributions of the CM storage server 102 from which the CM content is to be transferred is greater than the remaining number of the distributions CM storage servers 102 which are candidates to which the CM content is to be transferred and the differences are equal to or greater than the threshold, the CM distribution server 101-1 determines to transfer at least part of the remaining number of the distributions of the CM storage server 102 from which the CM content is to be transferred to other CM storage servers 102. The CM distribution server 101-1 sends the information about identifying the transfer destination CM storage server, the CM identifier of the transfer object CM content, and the number to transfer, to the CM storage server 102-1 from which the CM content is to be transferred.

The transfer source CM storage server 102-1 decreases the planned number of distributions of the CM identifier 001 in the CM control information 301 (FIG. 5) by the number that are to be transferred to the one or more other CM storage servers 102. Furthermore, the CM storage server 102-1 sends the CM identifier and the number to that are to be transferred to the CM storage server 102-2 to which the CM content is to be transferred. The CM storage server 102-2 to which the CM content is to be transferred increases the planned number of distributions of the CM identifier of interest in the CM control information 301 by the number to CM transfer. These operations/functionalities of the CM storage servers 102 are the same as those of the CM transfer means 105 in the CM storage server 102a (FIG. 12).

The CM transfer procedure is executed if a running CM storage server 102 is shut down, whereby a new CM storage server 102 is added, or the CM contents distributed by the CM distribution server 101 are replaced. When a running CM storage server 102 is shut down, the CM transfer means 105 executes the transfer procedure with the configuration indicating that the transfer source CM storage server is the CM storage server 102 that is shut down and the transfer object CM contents represent the contents stored on the CM storage server 102 that is shut down. The CM transfer means 105 acquires the remaining number of distributions of the CM contents from the other running CM storage servers 102.

The CM transfer means 105 transfers distributions of the CM contents stored in the CM storage server 102 that is shut down to other running CM storage servers 102 based on the remaining number of distributions. In one embodiment, the CM transfer means 105 selects the CM storage server 102 with the smallest number of distributions as the transfer destination CM storage server. In another embodiment, the CM transfer means 105 selects multiple CM storage servers 102 as the transfer destination CM storage servers and allocates the remaining number of distributions of the CM storage server 102 that is shut down according to the remaining number of distributions of the CM storage servers 102 to which the CM contents are to be transferred. With the CM transfer means 105 transferring distributions of the CM contents stored in the CM storage server 102 that is shut down to other running CM storage servers, the server distributing the CM contents are switched from the CM storage server 102 that is shut down to the other transfer destination running CM storage servers 102.

When a new CM storage server 102 is added, the CM transfer means 105 executes the transfer procedure with the configuration that the CM storage server from which the CM contents are to be transferred from is at least one of the running CM storage servers. When a new CM storage server 102 is added, the CM transfer means 105 acquires the remaining number of distributions from the CM storage servers 102. At this time, the newly added CM storage server 102 has not stored CM contents and the planned number of distributions and number of viewings are zero. Thus, the CM transfer means 105 would acquire the remaining number of distributions to be equal to zero from the newly added CM storage server 102.

If there is any contents of which the difference in the remaining number of distribution is equal to or greater than the threshold, then the CM transfer means 105 transfers at least part of the remaining number of distributions of the contents to the newly added CM storage server 102. The CM storage servers 102 to which the CM contents are to be transferred to are not limited only to the newly added CM storage servers, such as CM storage server 102, but can include other CM storage servers having a small remaining number of distributions. The CM transfer means 105 decreases the planned number of distributions of the CM storage server 102 from which the CM contents are to be transferred from by the number to transfer and increases the planned number of distributions for the newly added CM storage server 102 to which the CM contents are to be transferred to by the number to transfer. Furthermore, it transmits the CM contents to be transferred from to the newly added CM storage server 102. In this way, the newly added CM storage server 102 can distribute the CM contents to the reproduction terminal(s) 103.

The CM transfer means 105 executes the CM transfer procedure when the CM contents to be distributed are replaced. When CM contents are replaced because the contract has expired or the planned number of distributions has been distributed, the old CM contents before the replacement are deleted from the CM distribution server 101 and CM storage server 102. Also, the information about the old CM contents before the replacement is deleted from the CM management information 201 (FIG. 3) and CM control information 301 (FIG. 5). During the deletion of CM contents, the remaining CM contents stored in the CM storage servers 102 may be unbalanced. If unbalanced, then the CM transfer procedure is executed to equalize the CM contents among the CM storage servers 102.

The CM transfer means 105 acquires from each CM storage server 102, for example, the total remaining number of distributions of CM group information or the total remaining number of distributions of all CM contents in the CM storage server 102 in the transfer procedure responding to CM contents replacement. The CM transfer means 105 transfers CM contents distribution from a transfer source CM storage server 102 to a transfer destination CM storage server 102 when the difference in the remaining numbers of distributions is equal to or greater than the threshold. In this way, unbalanced CM contents distribution after CM replacement can be resolved.

In this embodiment, the CM transfer means 105 refers to the CM control information in the CM storage server 102 from which the CM contents are to be transferred from to obtain the remaining number of distributions of CM storage server 102 from which the CM contents are to be transferred from and refers to the CM control information in CM storage servers 102 which are candidates to which the CM contents are to be transferred to obtain the remaining number of distributions of CM storage servers 102 which are candidates to which the CM contents are to he transferred. The CM transfer means 105 transfers at least part of the remaining number of distributions of the transfer source CM storage server 102 to at least one of the CM storage servers 102 which are candidates to which at least a part of the distribution quantity (times) to be transferred based on the remaining number of distributions.

With the CM transfer means 105 transferring CM contents distribution from a CM storage server 102 having the larger number of remaining distributions to a CM storage server 102 having the smaller number of remaining distributions based on the remaining number of distributions, the differences between the remaining numbers of distributions of CM storage servers can be reduced. Furthermore, the CM storage server 102 having the smaller remaining number of distributions is considered as a CM storage server having distributed more CM contents to the reproduction terminals 103. Therefore, contents can be distributed more effectively with increasing the number of CM contents distributions from such a CM storage server 102 to the reproduction terminal(s) 103 contents.

Figure 17:
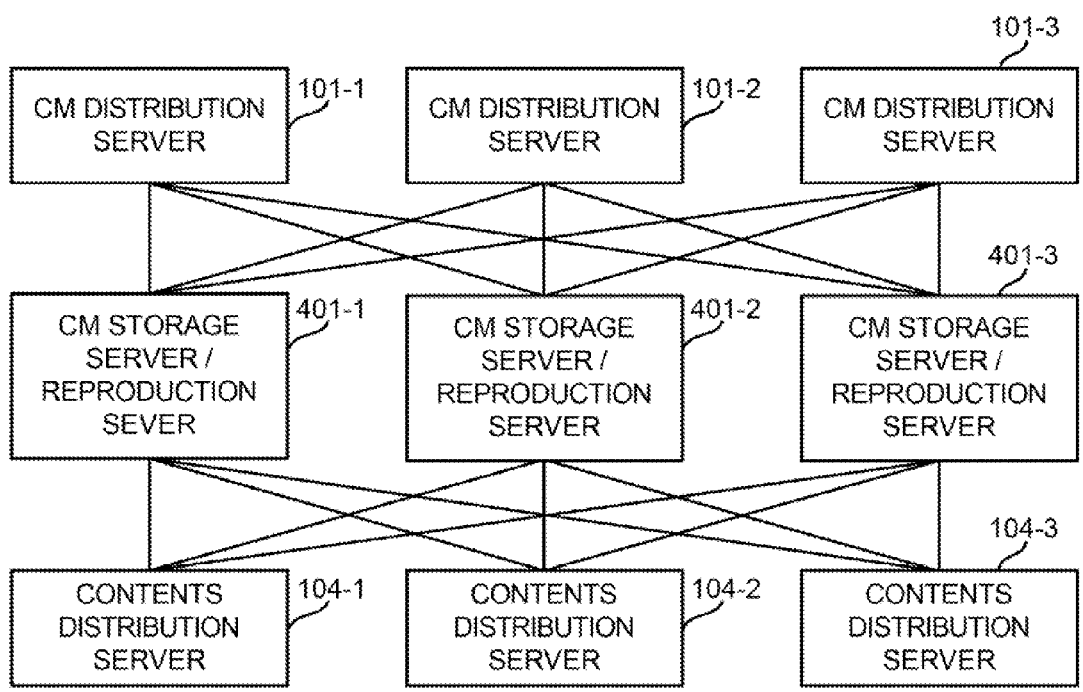
[FIG. 17] A block diagram illustrating the contents distribution system of a modified embodiment of the present invention.

In the embodiments, where the CM storage servers 102 and reproduction terminals 103 are independent of each other, the configuration that each of reproduction terminals 103 may also serve as a CM storage server 102 can operate. FIG. 17 illustrates such a configuration. CM storage servers/reproduction terminals 401 store and reproduce CM contents distributed from the CM distribution servers 101. Having the CM contents to be reproduced, the CM storage servers/reproduction terminals 401 reproduce the CM contents stored in the CM storage servers/reproduction terminals 401. Not having the CM contents to be reproduced, the CM storage servers/reproduction terminals 401 acquire the CM contents from a CM storage server/reproduction terminal 401 causing short delay in processing and reproduce it. In doing so, the CM storage servers/reproduction terminals 401 can store the CM contents to be reproduced and, in response to an acquisition request from another CM storage server/reproduction terminal 401, distribute the CM contents to the request source CM storage server/reproduction terminal 401.

In the above embodiments, the contents stored in the CM storage server (contents storage server) are CM contents. The stored contents are not limited to CM contents. The contents storage server can store other contents of which the planned distribution quantities are predetermined and distribute the other contents to the reproduction terminal(s) 103. For example, in FIG. 1, it is possible to provide a contents storage server storing contents distributed by the contents distribution server(s) 104 between the contents distribution server 104 and reproduction terminal 103, and contents storage server distribute the contents from the contents storage server to the reproduction terminal 103. In such a case, by allocating the total planned number of distributions of the contents which each of distribution servers 104 plans to reproduce at the reproduction terminal(s) 103 to the contents storage servers to which the contents are distributed the contents can be reproduced the planned times at the reproduction terminals 103.

In summary, the present invention can utilize the following modes.

The contents distribution system of the present invention comprises, as the minimum configuration, a first contents distribution server and one or more contents storage servers, wherein: the first contents distribution server comprises a contents record means that records contents management information including information about a total distribution quantity of a first contents of to be reproduced at reproduction terminals connected to the system, in a management information memory, wherein a contents distribution means that distributes the first contents to the at least one or more contents storage servers distributing the first contents to the reproduction terminals and sends a planned distribution quantity, determines a planned distribution quantity for each of the one or more contents storage servers that are to distribute the first contents, wherein the planned distribution quantity is based on the total distribution quantity and sends the planned distribution quantity to each of the one or more contents storage servers, respectively, and wherein each of the one or more contents storage servers comprises a contents storage means that receives the first contents and information about the planned distribution quantity from the first contents distribution server, records the first contents in a contents storage, and records in a control information memory contents control information, wherein the contents control information is information about the planned distribution quantity and information about a reproduction quantity, wherein the reproduction quantity represents an amount of the first contents that has been reproduced at reproduction terminals, and a contents transmission means that transmits the first contents to the reproduction terminals until the reproduction quantity of the first contents at the reproduction terminals reaches the reproduction quantity represented by the information about the planned distribution quantity.

Furthermore, the contents distribution server of the present invention comprises, as the minimum configuration, contents record means that records contents management information including information about a total distribution quantity of contents which is to be distributed and to be distributed to be reproduced at reproduction terminals, in a management information memory; and a contents distribution means that distributes the contents to the at least one or more contents storage server distributing the contents to the reproduction terminals, determines a planned distribution quantity for each of the one or more contents storage servers that are to distribute the first contents, wherein the planned distribution quantity is based on the total distribution quantity, and sends the planned distribution quantity to each of the one or more contents storage servers, respectively.

The contents storage server of the present invention comprises, as the minimum configuration, a contents storage means that receives contents and information about the planned distribution quantity that is determined based on the total distribution quantity of the contents to be reproduced at reproduction terminals from a contents distribution server distributing the contents, stores the contents in a contents storage, and records the information about planned distribution quantity in a control information memory; a reproduction quantity recording means that records in a control information memory contents control information, wherein the contents control information is information about the reproduction quantity of the contents reproduction at the reproduction terminals that have received the contents and the information about planned distribution quantity; and a contents transmission means that transmits the contents to the reproduction terminals until the reproduced quantity at the reproduction terminals reaches the reproduction quantity indicated by the information about planned distribution.

The contents delivery method of the present invention consists of, as the minimum configuration, a contents distribution method for deliver contents using a computer, having a step in which the computer stores contents to be distributed in a contents storage, and records information about total distribution quantity indicating the quantity of the contents to be reproduced at reproduction terminals in an management information memory that records contents management information including the information about total distribution quantity information; and a step in which the computer distributes the contents to one or more contents storage servers distributing the contents to reproduction terminals and sends information about planned distribution quantity, determines a planned distribution quantity for each of the one or more contents storage servers that are to distribute the first contents, wherein the planned distribution quantity is based on the information about total distribution quantity and sends the planned distribution quantity to each of the one or more contents storage servers, respectively.

The contents distribution method of the present invention consists of, as the minimum configuration, a contents delivery method for deliver contents using a computer, having a step in which the computer receives contents and information about planned distribution quantity that is determined based on the information about total distribution quantity indicating the quantity of the contents to be reproduced at reproduction terminals, from contents distribution server distributing contents; a step in which the computer stores the contents in a contents storage and records the information about planned distribution quantity in a control information memory recording contents control information including the information about planned distribution quantity and the information about reproduction quantity indicating the reproduction quantity of contents at reproduction terminals; a step in which the computer records the information about reproduction quantity of the first contents distributed from the computer to reproduction terminals and reproduced at the reproduction terminals, in the control information memory; and a step in which the computer transmits the contents to the reproduction terminals until the reproduced quantity reaches at least the reproduction quantity indicated by the information about planned distribution.

The computer-readable program stored in a computer readable recording medium and, as the minimum configuration, allowing a computer to execute a procedure to store contents to be distributed in a contents storage, and record information about total distribution quantity indicating the quantity of the contents to be reproduced at reproduction terminals in an management information memory that records contents management information including the information about total distribution quantity information; and a procedure to distribute the contents to one or more contents storage servers distributing contents to the reproduction terminals and send d information about planned distribution quantity, determines a planned distribution quantity for each of the one or more contents storage servers that are to distribute the first contents, wherein the planned distribution quantity is based on the information about total distribution quantity and sends the planned distribution quantity to each of the one or more contents storage servers, respectively.

The computer-readable program stored in a computer readable recording medium and as the minimum configuration, allowing a computer to execute: a procedure to receive contents and information about planned distribution quantity that is determined based on the information about total distribution quantity indicating the quantity of the contents to be reproduced at reproduction terminals, from contents delivery sever delivering contents; a procedure to store the contents in a contents storage and record the information about planned distribution quantity in a control information memory recording contents control information including the information about planned distribution quantity and the information about reproduction quantity indicating the reproduction quantity of contents at reproduction terminals; a procedure to record the information about reproduction quantity of the first contents distributed to reproduction terminals and reproduced at the reproduction terminals, in the control information memory; and a procedure to transmit the contents to the reproduction terminals until the reproduction quantity reaches at least the reproduction quantity indicated by the information about planned distribution quantity.

The contents distribution system of the present invention can have a configuration that is further comprising a first content transferor, wherein the first content transferor is one of the one or more contents storage servers that transfer the first content; at least one first content candidate receiver, wherein the at least one first content candidate receiver is at least one of the one or more content storage servers that receives the transfer of the first content;

a contents transfer means that refers to contents control information in the first content transferor, obtains the remaining distribution quantity on the first content transferor based on the information of planned distribution quantity and the information about reproduction quantity, obtains the remaining distribution quantity of the at least one first content candidate receiver by referring to the contents control information of the at least one first content candidate receiver, and transfers at least part of the remaining distribution quantity of the first content transferor to the at least one first content candidate receiver based on the remaining distribution quantity.

The contents distribution system of the present invention can have a configuration in which the contents transfer means executes the transfer procedure if a contents storage server is shut down, a new contents storage server is added, or the first contents are replaced at the first contents distribution server.

The contents distribution system of the present invention can have a configuration in which the contents transfer means compares the remaining distribution quantity of the first content transferor with the remaining distribution quantity of the first content candidate receiver and, if the remaining distribution quantity of the first content transferor is greater than the remaining distribution quantity of the at least one first content candidate receiver and the differences are equal to or greater than a given threshold, transfers at least part of the remaining distribution quantity of the first content transferor, to at least one of the first content candidate receiver.

The contents distribution system of the present invention can have a configuration in which the contents transfer means decreases the planned distribution quantity of the first content transferor by the quantity to be transferred to the at least one first content candidate receiver and increases the planned distribution quantity of the at least one first content candidate receiver by the quantity to be transferred to this contents storage server.

The contents distribution system of the present invention can have a configuration in which the contents control information further includes contents group information, and the contents storage server receives the contents group information from the reproduction terminal and distributes the first contents corresponding to the received contents group information to the reproduction terminal.

The contents distribution system of the present invention can have a configuration in which if multiple first contents correspond to the contents group information received from the reproduction terminal, the contents storage server compares the differences between the planned distribution quantity of the each first contents and reproduction quantity of multiple first contents, and determines the first contents to be distributed to the reproduction terminal based on the differences between the planned distribution quantity and reproduction quantity.

The contents distribution system of the present invention can further comprising a second contents distribution server that distributes second contents to the reproduction terminal, wherein the second contents distribution server transmits the contents group information specifying the group of the first contents to be reproduced along with reproduction of the second contents to the reproduction terminals, wherein the contents storage server receives the contents group information, transmitted by the second distribution server, from the reproduction terminals.

The distribution system of the present invention can have a configuration in which the reproduction terminal selects a contents storage server, which is the source of the first contents from candidate contents storage means that receives the first contents based on at least one of the following: the number of available sessions at a contents storage server and the communication delay between the reproduction terminal and a contents storage server.

The contents distribution system of the present invention can have a configuration in which the reproduction terminals estimates the communication delay between the reproduction terminal and the one or more contents storage servers based on at least one of the following: the position management information of the reproduction terminal, the response time of the contents storage server when the reproduction terminal transmits a predetermined signal transmitted thereto, and the number of hops on the network between the reproduction terminal and the contents storage servers, and selects one of the contents storage servers which is to be the first contents distribution source based on the estimation results.

The contents distribution system of the present invention can have a configuration in which the reproduction terminals serves as the contents storage server.

The presentment invention is specified and described with reference to exemplary embodiments above. The present invention is not confined to the embodiments and their modifications. As apparent to a person of ordinary skill in the field, various modifications can be made to the present invention without departing from the spirit and scope of the present invention defined by the attached scope of claims.

The invention claimed is:

1. A contents storage server, comprising:
   a contents storage unit that receives contents and information about the planned distribution quantity to be allocated to the content storage server that is determined based on the total distribution quantity of the contents to be reproduced at reproduction terminals from a contents distribution server distributing the contents to a plurality of contents storage servers, stores the contents in a contents storage, and records the information about the planned distribution quantity in a control information memory;
   a reproduction quantity recording unit that records in a control information memory contents control information, wherein the contents control information is information about the reproduction quantity of the contents reproduction at the reproduction terminals that have received the contents and the information about planned distribution quantity; and
   a contents transmission unit that transmits the contents to each one of the reproduction terminals until the reproduced quantity at the reproduction terminals reaches the reproduction quantity indicated by the information about planned distribution, wherein
   the planned distribution quantity allocated to the contents storage server is one of multiple planned distribution quantities determined for allocating the total distribution quantity of the contents to each of the plurality of contents storage servers.

2. A contents storage server, comprising:
   a contents storage unit that receives contents and information about the planned distribution quantity that is determined based on the total distribution quantity of the contents to be reproduced at reproduction terminals from a contents distribution server distributing the contents, stores the contents in a contents storage, and records the information about planned distribution quantity in a control information memory;
   a reproduction quantity recording unit that records in a control information memory contents control information, wherein the contents control information is information about the reproduction quantity of the contents reproduction at the reproduction terminals that have received the contents and the information about planned distribution quantity;
   a contents transmission unit that transmits the contents to the reproduction terminals until the reproduced quantity at the reproduction terminals reaches the reproduction quantity indicated by the information about planned distribution; and a contents transfer unit that refers to the contents control information, obtains the remaining distribution quantity from the information about planned distribution quantity and the information about reproduction quantity, acquires the remaining distribution quantity of other contents storage servers from other contents storage servers, and transfers at least part of a remaining distribution quantity of the CM storage server associated with the CM transfer unit to at least one of the contents storage servers which are candidates to which at least part of the distribution quantity is transferred based on the remaining distribution quantity.

* * * * *